United States Patent
Aggarwal et al.

(10) Patent No.: US 11,283,964 B2
(45) Date of Patent: Mar. 22, 2022

(54) UTILIZING INTELLIGENT SECTIONING AND SELECTIVE DOCUMENT REFLOW FOR SECTION-BASED PRINTING

(71) Applicant: Adobe Inc., San Jose, CA (US)

(72) Inventors: Vipul Aggarwal, Sunder Vihar (IN); Pranjal Bhatnagar, Noida (IN); Nipun Poddar, Noida (IN); Naveen Goel, Noida (IN); Amit Gupta, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/879,019

(22) Filed: May 20, 2020

(65) Prior Publication Data

US 2021/0368064 A1    Nov. 25, 2021

(51) Int. Cl.
| | |
|---|---|
| H04N 1/387 | (2006.01) |
| G06N 20/00 | (2019.01) |
| G06F 16/93 | (2019.01) |
| G06K 9/00 | (2022.01) |
| G10L 15/10 | (2006.01) |
| H04N 1/00 | (2006.01) |
| G10L 15/22 | (2006.01) |

(52) U.S. Cl.
CPC ........... H04N 1/3872 (2013.01); G06F 16/93 (2019.01); G06K 9/00456 (2013.01); G06N 20/00 (2019.01); G10L 15/10 (2013.01); G10L 15/22 (2013.01); H04N 1/0044 (2013.01); H04N 1/00403 (2013.01); H04N 1/00411 (2013.01)

(58) Field of Classification Search
CPC .................................................. H04N 1/3872
USPC ........................................................ 358/1.18
See application file for complete search history.

(56) References Cited

U.S. PATENT DOCUMENTS

| | | | |
|---|---|---|---|
| 10,013,488 B1 * | 7/2018 | Zhao | G06F 16/7335 |
| 10,956,731 B1 * | 3/2021 | Gupta | G06F 16/93 |
| 2018/0046708 A1 * | 2/2018 | Stewart | G06F 16/338 |
| 2021/0049239 A1 * | 2/2021 | Li | G06F 40/14 |
| 2021/0133439 A1 * | 5/2021 | Mehra | G06K 9/6267 |

* cited by examiner

*Primary Examiner* — Jacky X Zheng
(74) *Attorney, Agent, or Firm* — Keller Jolley Preece

(57) ABSTRACT

The present disclosure relates to systems, non-transitory computer-readable media, and methods for utilizing intelligent sectioning and selective document reflow for section-based printing. For example, the disclosed systems can intelligently identify document objects (e.g., document structures and sections) within a digital document by utilizing a machine-learning model. In so doing, the disclosed systems can identify document-object types and document-object locations for the document objects in the digital document. In turn, the disclosed systems can provide, for display within a dynamic printing interface, selectable document sections comprising the identified document objects. In response to a user selection of one or more of the selectable document sections, the disclosed system can generate a modified digital document for printing by reflowing the identified document objects in accordance with the user selection. In some cases, reflowing comprises removing unselected document objects and/or repositioning one or more of the selected document objects.

20 Claims, 19 Drawing Sheets

Page 2 ac justo. Nullam eget mollis nunc. Ut bibendum porta urna, vitae suscipit ipsum egestas at. Aliquam interdum nibh commodo tortor porttitor, vel laoreet odio aliquet. Nullam id accumsan mi. Sed cursus auctor sapien tincidunt convallis. Nunc vulputate felis ac tellus tempor commodo. Duis lectus nulla, posuere non condimentum ut, malesuada id nisl. Ut ultrices nibh eu ipsum facilisis elementum. Praesent non pulvinar elit.

Page 1

Lorem ipsum dolor sit amet, consectetur adipiscing elit. Aliquam quis tristique ipsum. Sed fermentum nisi ac dui hendrerit, quis tincidunt purus laoreet. Morbi consequat, nisi vel consectetur hendrerit, quam purus vestibulum enim, dictum vestibulum neque urna eu mi. Fusce nibh turpis, molestie eu viverra non, blandit

*Fig. 6A*

UTILIZING INTELLIGENT SECTIONING AND SELECTIVE DOCUMENT REFLOW FOR SECTION-BASED PRINTING

BACKGROUND

Recent years have seen significant improvements in hardware and software platforms for printing digital content via computer devices. Indeed, conventional printing systems can print digital documents by identifying user input of individual pages of digital documents and then transmitting data for generating a physical representation or digital representation of the selected pages. Unfortunately, a number of problems exist with conventional printing systems that lead to wasted printing resources, excessive user interactions when printing, and decreased flexibility to accurately print desired content.

BRIEF SUMMARY

Embodiments of the present disclosure provide benefits and/or solve one or more of the foregoing or other problems in the art with systems, non-transitory computer-readable media, and methods that utilize intelligent sectioning and selective document reflow for section-based printing. For example, the disclosed systems can intelligently identify document objects (e.g., document structures and sections) within a digital document by utilizing a machine-learning model and/or heuristic algorithms. In particular, the disclosed systems can apply a machine-learning model to identify document sections and locations for the document sections in the digital document. In turn, the disclosed systems can provide, for display within a dynamic printing interface, selectable elements comprising the identified document sections. In response to a user selection of one or more of these selectable elements, the disclosed system can generate a modified digital document for printing by reflowing the identified document objects in accordance with the user selection. For example, the disclosed systems can intelligently remove unselected document objects and reposition the selected document objects to fill in blank space and flow between pages of the modified digital document. Indeed, based on document-object types within a digital document (e.g., text, tables, images, etc.), the disclosed systems can modify positions, scales, and breaking points to generate a modified digital document that smoothly and accurately flows between the document sections selected for printing.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIGS. 6A-6B illustrate a digital document and applying a scaling factor to a text object in accordance with one or more embodiments.

DETAILED DESCRIPTION

Figure 1:
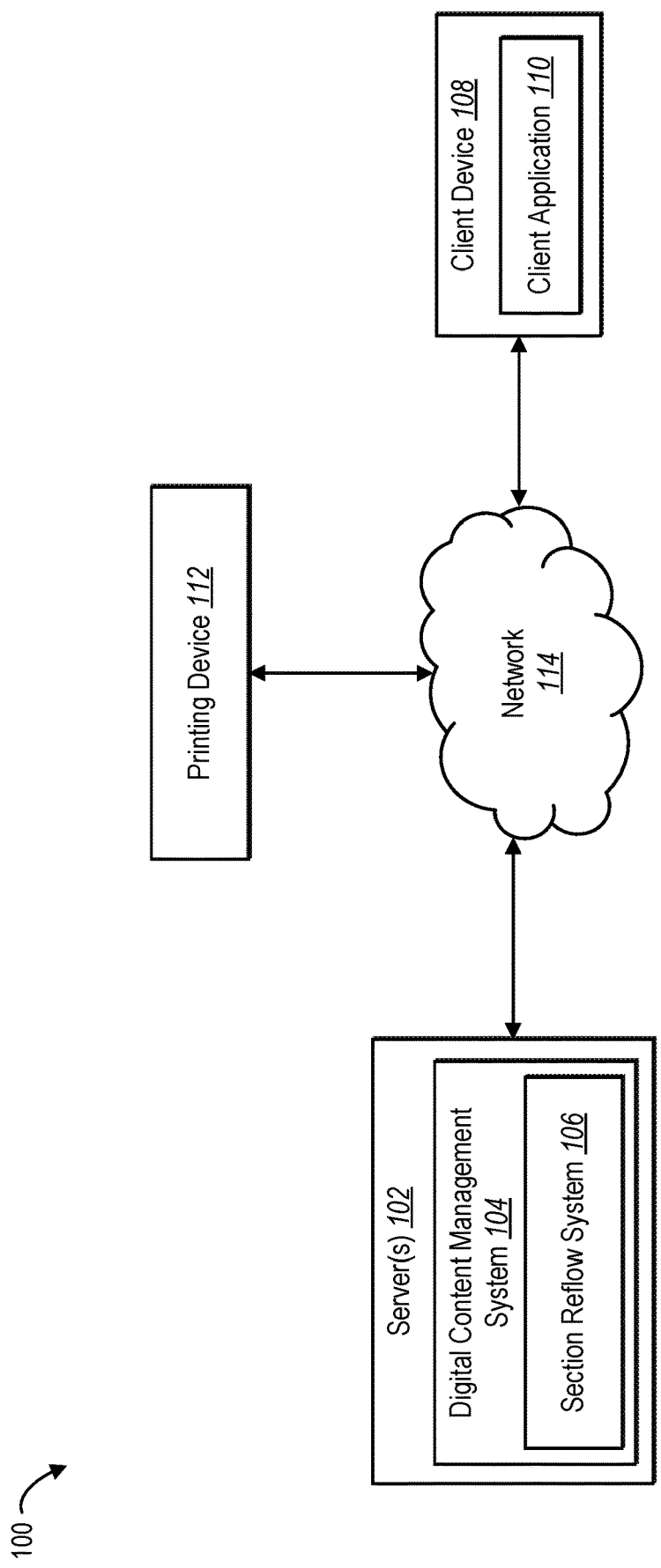
FIG. 1 illustrates a diagram of a system environment including a section reflow system in accordance with one or more embodiments.

One or more embodiments described herein include a section reflow system that intelligently generates document section filters for reflowing user-selected document objects to print in a modified digital document. For example, in one or more embodiments, the section reflow system can utilize a machine learning model to identify document objects and corresponding document object locations within a digital document. Based on the identified document objects, the section reflow system can generate a graphical user interface that includes a table of contents with selectable section filters. In response to user selection of one or more selectable section filters, the section reflow system can utilize selected sections to customize a printable version of the digital document. Specifically, the section reflow system can utilize determined locations of document objects within the digital document to generate a modified digital document that excluded unselected document sections and repositions the selected document sections. Indeed, the section reflow system can intelligently reposition individual digital objects to fill empty space in a modified digital document, split document objects between pages, apply scaling factors or other transformations to document objects, and generate a modified digital document that accurately and efficiently flows between selected document sections. In some implementations, the section reflow system can further transmit the modified digital document to a printing device for printing the modified digital document.

As just mentioned, the section reflow system can identify document objects within a digital document. For example, the section reflow system can convert the digital document into a digital document image (e.g., in a portable document format). Then, the section reflow system can identify location data and object-content data for document objects within the digital document image. For example, the section reflow system can utilize a machine-learning model (e.g., an object detection model) to determine location data of document objects (e.g., page ranges and location coordinates within the digital document). Further, the section reflow system can utilize the machine-learning model to identify and/or classify document objects. For example, the section reflow system can identify a variety of objects from digital documents, including text blocks, images, tables, sections, and headings.

As mentioned above, the section reflow system can utilize document objects to generate a table of contents. For example, the section reflow system can identify an organization of sections from the document objects and then utilize the organization of sections to generate a table of contents. To illustrate, the section reflow system can identify sections defined by headers, text blocks, or images, and then generate a table of contents that reflects the different sections. In some embodiments, the section reflow system determines a sequential order of sections within the table of contents based on the sequential location of underlying document objects within the digital document.

In one or more embodiments, the section reflow system generates a printing user interface that portrays the table of contents. In particular, the section reflow system can generate a user interface that includes a table of contents with selectable elements corresponding to identified document sections. The section reflow system can utilize a variety of selectable user interface elements for portraying document sections, including radio buttons, check boxes, or event elements activated by audio input. For example, in some embodiments, the section reflow system can identify audio input from a user and utilize a speech-to-text model to select document sections from a table of contents.

As mentioned above, in response to selection of document sections via the printing user interface, the section reflow system can generate a modified digital document for printing. For example, the section reflow system can remove unselected document sections and/or reposition selected document sections to generate a modified document. In some implementations, the section reflow system repositions the selected document sections to fill whitespace that results from removing the unselected document sections.

The section reflow system can iteratively reposition different sections and document objects to generate a modified document. For example, the section reflow system can move a first document section to the top of a first page, and then determine a new location for a second document section based on remaining space on the first page. In particular, the section reflow system can determine a print boundary and ascertain whether the second document section fits within the print boundary. If not, the section reflow system can take a variety of approaches to accurately generate a modified document that flows between sections. For example, if the second document section is a digital image, the section reflow system can move the second document section to a second page in the modified digital document. If the second document section is text or a table, the section reflow system can intelligently divide the document section over multiple document pages. Moreover, in some embodiments, the section reflow system can apply a scaling factor (e.g., to a document section comprising text) in order to fit a document section within a print boundary.

As briefly mentioned above, a number of technical problems exist with conventional systems with regard to accuracy, flexibility, and efficiency. For example, conventional systems have limited flexibility to accurately print desired content from a digital document. Specifically, conventional systems usually provide limited options to print all of the pages in a digital document, a current page of a digital document, a selected page range (e.g., pages 2-3), odd or even pages, etc. These page-specific approaches, however, are often too course to accurately reflect the needed portions of a digital document. That is, conventional systems typically print unnecessary and inaccurate content surrounding the actual content targeted for printing.

The inaccuracy and inflexibility of conventional systems also leads to inefficient operation. For example, conventional systems often waste printer processing bandwidth and other printing resources (such as ink and paper). To illustrate, by printing unnecessary content, conventional systems process and transmit extraneous digital information to printing devices for each print job. Compounded over the hundreds, or in some cases, thousands of print jobs a given printer may perform on regular (e.g., daily) basis, the approaches of conventional systems result in significant inefficiencies in resources. Moreover, printing excess portions of a digital document can result in increased print-job times, additional printer delays, increased bandwidth consumption, and decreased print-job throughput. Such overprinting can also lend to significantly reduced printer lifetimes from the additional wear-and-tear of over-printing.

In addition, conventional systems are also inefficient in that they typically require excessive user interactions. For example, conventional systems often require client devices to navigate through the digital document to identify and select the specific pages for printing. For example, a desired portion for printing may span multiple pages and/or may be located in various parts of the document. To avoid printing the entire digital document (especially for books, manuals, magazines, etc.), conventional systems require excessive user inputs to scroll (or click, swipe, etc.) through the digital document to locate the desired portions. Once a user identifies the particular portions of the digital document to print, conventional systems then require further user inputs to specify the pages that include the desired portions. This approach can also introduce errors by accidentally identifying the incorrect pages to print. Accordingly, conventional systems can require a burdensome amount of user interactions and interfaces to print desired content in a digital document.

In contrast to the foregoing problems, the section reflow system provides several technical advantages over conventional printing systems. As one example, the section reflow system provides increased flexibility for selectively printing accurate document sections. For example, where conventional systems limit print selection to coarse pages, the section reflow system provides a more fine resolution for printing that allows client devices to more accurately align printed documents to target sections. In particular, by providing a printing user interface for user selection of content-specific portions within a digital document the section reflex system significantly increases flexibility for client devices to choose what portions of a digital document to print (or not print). Thus, the section reflow system can exclude unselected document sections from being printed by generating a modified digital document for printing that includes a consolidated version of document sections corresponding to a user selection at the printing user interface.

Due in part from the increased flexibility and accuracy as just described, the section reflow system also improves efficiency relative to conventional systems. For example, by generating a modified digital document for printing selected document sections (and not unselected document sections), the section reflow system can reduce processing bandwidth consumption and other printing resources. For example, the section reflow system can reduce the amount of ink, paper, and/or printing time for print-jobs of modified digital documents. In turn, the section reflow system can increase a throughput of print-jobs by reducing printing time and increasing available bandwidth. In some cases, the section reflow system can further extend the life of printer devices or printer components by transmitting modified digital documents to print at the printing device, which results in less printing (and lengthens a time duration before printer components cycle to failure).

In addition, the section reflow system improves efficiency by reducing user interactions and the corresponding burden on computer processing resources. For example, rather than requiring user inputs to navigate through a digital document to find the desired content for printing, the section reflow system generates a table of contents and provides document sections within a printing user interface. Based on minimal user inputs (e.g., selection of one or more sections from the table of contents in the printing user interface), the section reflow system can generate a modified digital document for printing that includes the selected document sections. Thus, the section reflow system reduces user interactions, user interfaces, and corresponding processing resources relative to conventional systems while also reducing printing errors that stem from user input of incorrect page selections.

As illustrated by the foregoing examples, the present disclosure utilizes a variety of terms to describe features and advantages of the section reflow system. For instance, as discussed above, the section reflow system can analyze a digital document and print selected sections of the digital document. A digital document can include a digital file or digital content (e.g., that is capable of being printed). A digital document can include a digital file in a variety of digital formats or file types (e.g., .docx, .xlsx, .pdf, .jpg, etc.). Thus, a digital document can include a word processing document, a webpage, a digital document image (e.g., a .pdf reflecting text, tables, or images), or a spreadsheet.

As mentioned above, when the section reflow system edits or modifies a digital document, the section reflow system can generate a separate digital document referred to as a modified digital document. To do so, in some embodiments, the section reflow system converts a digital document into a digital document image (e.g., a portable document file or PDF), which the section reflow system can modify. A modified digital document can include a digital document where one or more sections have been removed, repositioned, and/or or scaled.

As additionally used herein, the term document objects can include digital content or digital items within a digital document. Examples of document objects can include text (e.g., paragraph text, headings, sub-headings, table values/headers, captions, etc.), tables comprising row/column data, images, and the like. A document object can also include a document section.

As used herein, the term document section refers to one or more portions of a digital document (e.g., content-based portions that are different than a page or page-range). In particular, a document section may include one or more document objects identified as a discrete, selectable part of the digital document. For example, in some implementations, a document section comprises multiple document objects like a paragraph heading with associated paragraph(s). In other implementations, a document section comprises a single document object (e.g., a table or image). Thus, in some embodiments, a document section is at least partially content-based and includes a part of the document that is different than a full page or page range (e.g., less than a single page, between a single page and two pages, or some other length that does not align to a range of full pages). That is, based on object-content data, the section reflow system can identify some document objects as corresponding to one document section and not another document section. For instance, the section reflow system may identify a first set of document objects as corresponding to a first document section and a second set of document objects as corresponding to a second document section different than the first document section. As an example, if the first document section and the second document section are on a same document page, the section reflow system can selectively print the first document section and not the second document section.

As further used herein, the term machine-learning model can include a model that can be tuned (e.g., trained) based on inputs to approximate unknown functions. For example, a machine-learning model can include a decision tree model, regression model, gradient boosting algorithm, or a neural network (e.g., a convolutional neural network, recurrent neural network, etc.). As an example, the section reflow system may implement an object detection machine-learning model to identify document objects and generate document-object identifiers. In addition, the section reflow system may utilize an object detection machine-learning model to determine location data of document objects.

As also used herein, the term document-object identifiers refers to a label, indicator, or representation of a document object or a document section. Document-object identifiers may include descriptions of document objects (e.g., keywords, phrases, titles, headings, sub-headings, captions, figure descriptions, header rows, and the like), excerpts of document objects (e.g., topic sentences), and/or metadata (e.g., tags, table variables, etc.).

As referred to herein, location data can include spatial data that references spatial positioning of one or more portions of a document object within a document page. In particular, location data can include coordinate locations (e.g., X-Y coordinates) of a document page that reference a spatial position in reference to an origin (e.g., an origin can be centered on the document page, positioned at a print boundary corner, or other suitable location). In some embodiments, location data can indicate a boundary associated with a document object, such as an upper or lower boundary (e.g., a portion of a detected perimeter, border, or document footprint) of a document object. Additionally or alternatively, location data can reference various points, lines, or portions of a document page, such as a print boundary (e.g., a printing margin beyond which printing does not occur). Further, in some embodiments, location data may include a page range (i.e., specific document pages).

In addition, as used herein, the term table of contents refers to an outline of contents of a digital document. In particular, a table of contents can include an outline of sections within a digital document. For example, a table of contents can include selectable printing elements (e.g., selectable document sections) arranged according to location data and information relating to identified document objects (e.g., object-content data).

As further used herein, the term speech-to-text model refers to a natural language processing model that converts an input comprising a verbal utterance (e.g., spoken word or vocalized sound) into text. In particular, the section reflow system can utilize a speech-to-text model to identify a voice-selection to print one or more document sections in a table of contents, for instance, as described more below in relation to FIG. 9.

Additional detail will now be provided regarding the section reflow system in relation to illustrative figures portraying example embodiments and implementations. For example, FIG. 1 illustrates a computing system environment (or "environment") 100 for implementing a section reflow system 106 in accordance with one or more embodiments. As shown in FIG. 1, the environment 100 includes server(s) 102, a client device 108, a printing device 112, and a network 114. Each of the components of the environment 100 can communicate via the network 114, and the network 114 may be any suitable network over which computing devices can communicate. Example networks are discussed in more detail below in relation to FIG. 12.

As shown in FIG. 1, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 12. Although FIG. 1 illustrates a single client device 108, in some embodiments the environment 100 can include multiple client devices 108. The client device 108 can further communicate with the server(s) 102 via the network 114. For example, the client device 108 can receive user input and provide information pertaining to the user input (e.g., that relates to a selected document section for printing) to the server(s) 102.

As shown, the client device 108 includes a corresponding client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including a table of contents comprising identified document sections of a digital document. In addition, the user can interact with the client application 110 to provide user input to, for example, select one or more document sections for printing a modified digital document comprising the selected document section(s).

As mentioned, the environment 100 includes the printing device 112. The printing device 112 can include a variety of computing devices as described in relation to FIG. 12. In particular, the printing device 112 can communicate with the client device 108 and/or the section reflow system 106 to print a modified digital document in accordance with a user selection of one or more document sections. Although FIG. 1 illustrates a single printing device 112, in some embodiments the environment 100 can include multiple different printing devices 112. In addition, the printing device 112 can communicate with the server(s) 102 via the network 114 or multiple client devices.

As illustrated in FIG. 1, the environment 100 includes the server(s) 102. In some embodiments, the server(s) 102 comprises a content server and/or a data collection server. The server(s) 102 can also comprise an application server, a communication server, a web-hosting server, a social networking server, or a digital content management server. In particular, the server(s) 102 may learn, generate, store, receive, and transmit electronic data, such as executable instructions for detecting document objects in a digital document, generating a table of contents comprising selectable document sections, modifying a digital document in response to a user selection of one or more selected document sections, etc. For example, the server(s) 102 may receive data from the client device 108 based on user input to print a digital document. In turn, the server(s) 102 can transmit data to one or more components in the environment 100. For example, the server(s) 102 can transmit the digital document to the section reflow system 106 to intelligently identify document objects and create a table of contents. Additionally, for example, the server(s) 102 may receive data from the client device 108 based on user input to select a document section included in the table of contents for printing. In turn, the server(s) 102 can transmit an indication of the user selection to the section reflow system 106 for generating a modified digital document with unselected document sections removed and selected document sections repositioned for efficient printing. These and other example communications between the server(s) 102 and other components of the environment 100 are herein contemplated.

Although FIG. 1 depicts the section reflow system 106 located on the server(s) 102, in some embodiments, the section reflow system 106 may be implemented by one or more other components of the environment 100 (e.g., by being implemented entirely or in part at one or more of the other components). For example, the section reflow system 106 may be implemented by the client device 108, the printing device 112, and/or another suitable device.

As shown in FIG. 1, the section reflow system 106 is implemented as part of a digital content management system 104 located on the server(s) 102. The digital content management system 104 can organize, manage, and/or execute acts and algorithms disclosed herein to detect document objects and generate a modified digital document for printing. For example, the digital content management system 104 can view, create, manipulate, print, and manage digital documents in one or more file types. The digital content management system 104 can also process user inputs to store, transmit, and/or edit digital documents.

In some embodiments, though not illustrated in FIG. 1, the environment 100 may have a different arrangement of components and/or may have a different number or set of components altogether. For example, the client device 108 and/or the printing device 112 may communicate directly with the section reflow system 106, bypassing the network 114.

As another example, the printing device 112 may comprise a digital printer instead of a physical printer. For instance, in some implementations, the section reflow system 106 may transmit a modified digital document comprising selected document sections to a digital printer in response to receiving a user request to "print to PDF" or "save as a PDF." The digital printer can then return or store (e.g., in a specified computer-file location) a saved version of the modified digital document.

Figure 2:
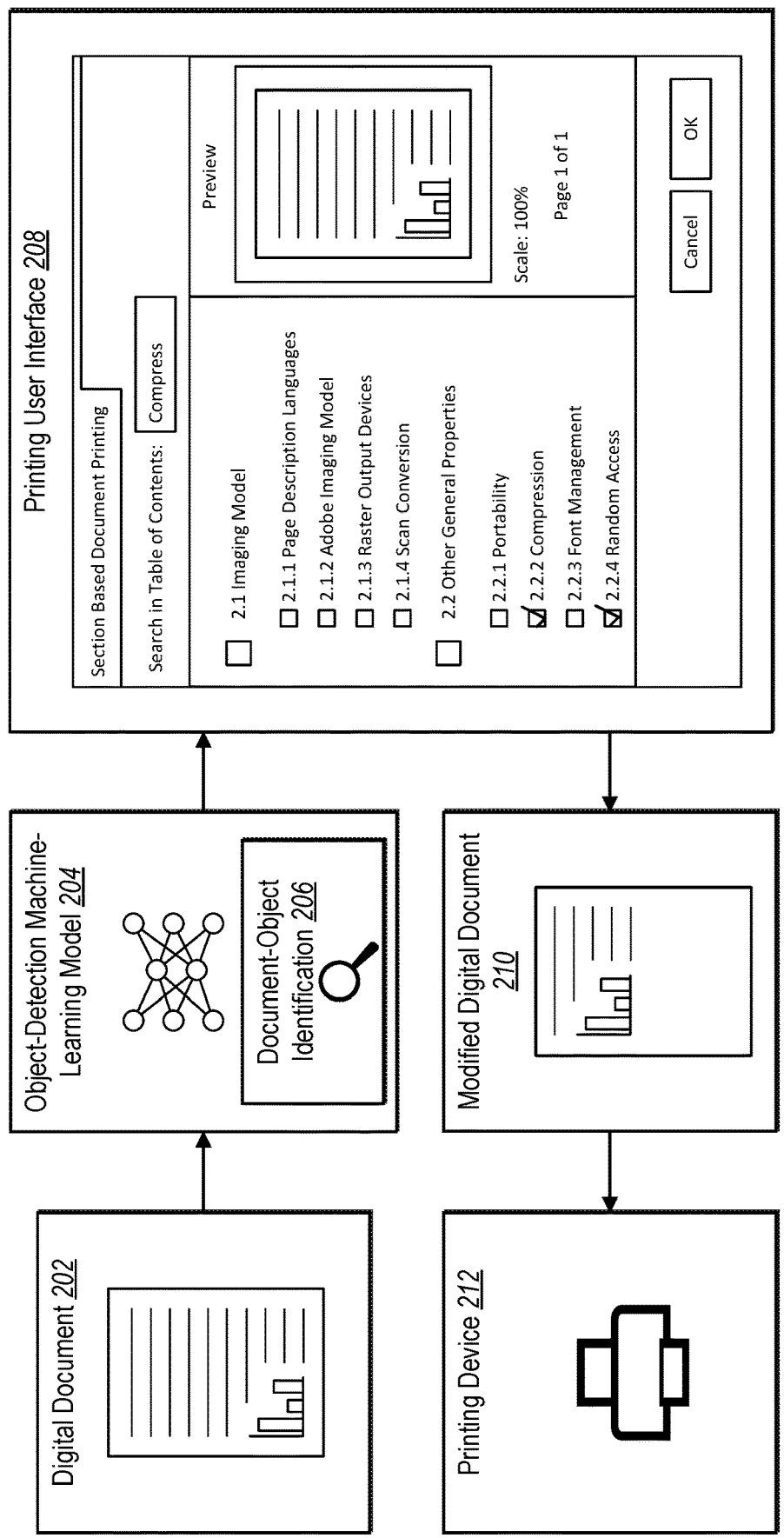
FIG. 2 illustrates a section reflow system generating a modified digital document for printing in accordance with one or more embodiments.

As mentioned above, the section reflow system 106 can identify document objects within a digital document, provide a printing user interface for display, and generate a modified digital document for printing based on user selection of one or more identified document objects. FIG. 2 illustrates the section reflow system 106 generating a modified digital document 210 in accordance with one or more embodiments. As shown, the section reflow system 106 can utilize an object-detection machine-learning model 204 to intelligently identify document objects within a digital document 202. Based on document-object identification 206, the section reflow system 106 can provide, for display at a client device, a printing user interface 208. In response to user input at the printing user interface 208, the section reflow system 106 can generate the modified digital document 210 for printing at a printing device 212.

In more detail, the section reflow system 106 can utilize the object-detection machine-learning model 204 to perform document-object identification 206 by determining location data and object-content data of document objects in the digital document 202 as described more below in relation to FIG. 3A. In particular, the section reflow system 106 can convert the digital document 202 to a digital document image and analyze the digital document image utilizing the object-detection machine-learning model 204 (and one or more heuristic models). The section reflow system 106 can utilize the object-detection machine-learning model 204 to determine document sections and the upper and lower coordinates of the document sections.

Moreover, as illustrated, the section reflow system 106 can utilize identified document sections to generate the printing user interface 208. As shown, the printing user interface 208 includes a table of contents arranged with selectable document sections. To generate the printing user interface 208 and the table of contents, the section reflow system 106 can utilize the detected document sections (and corresponding identifiers) and arranged the document sections sequentially based on the locations of the document sections within the digital document 208.

As mentioned above, the approach illustrated in FIG. 2 can reduce user inputs and processing power needed to navigate a print preview pane or the digital document 202 to identify document pages for printing at the printing device 212. Rather, utilizing the printing user interface 208, the section reflow system 106 can receive an indication of a user input (e.g., a click, tap, etc.) at certain document section(s) in the table of contents for selectively printing document sections corresponding to the user input. Accordingly, the section reflow system 106 can avoid the time, interactions, and processing power required in navigating the digital document 202 as a whole.

To print the selected document sections, the section reflow system 106 generates the modified digital document 210 by removing unselected document sections and repositioning the selected document sections (as described in more detail below in relation to FIG. 3B). In particular, the section reflow system 106 can move, scale, split, and reposition selected document objects to generate a modified document that smoothly flows between document sections and across different pages.

In turn, the section reflow system 106 can send the modified digital document 210 to the printing device 212. For example, the section reflow system 106 can transmit the modified digital document 210 directly to the printing device 212. In yet another example, the section reflow system 106 can transmit the modified digital document 210 to a client device for relaying to the printing device 212. As a further example, the printing device 212 may include a digital printer. For instance, the section reflow system 106 can send the modified digital document 210 to the printing device 212 as a digital printer that saves a version of the modified digital document 210. In this manner, the section reflow system 106 can generate the modified digital document 210 for increased readability and improved resource efficiency as a user-friendly and printer-friendly document for printing at the printing device 212.

As mentioned above, the section reflow system 106 can determine location data and document-object content for document objects when analyzing a digital document. FIG. 3A illustrates the section reflow system 106 utilizing an object-detection machine-learning model 304 to generate a table of contents 328 in accordance with one or more embodiments. As shown, the section reflow system 106 utilizes the object-detection machine-learning model 304 to generate the table of contents 328 by processing a digital document 302. In particular, as shown, the section reflow system 106 performs a document conversion 306 and a document-object identification 308.

In more detail, the section reflow system 106 can convert the digital document 302 to a digital document image at the document conversion 306. For example, the section reflow system 106 may convert a file type of the digital document 302 from .docx, .xlsx, .pptx, etc. to a digital document image (such as a portable document format) in a variety of ways. For example, the section reflow system 106 can change the filename extension of the digital document 302, saving the digital document 302 as a PDF document. Similarly, the section reflow system 106 can utilize an algorithm that maps the contents of document to graphic representations. To illustrate, the section reflow system 106 can convert the digital document 302 to vector graphics (e.g., lines, curves, text, glyphs, etc. that can be divided across multiple pages) and/or raster images (e.g., images comprising a collection of dots or pixels that are not divided across multiple pages).

As mentioned above, the section reflow system 106 can utilize the object-detection machine-learning model 304 to perform the document-object identification 308. As shown, the section reflow system 106 can determine the location data 310 and/or the object-content data 318. In some implementations, the object-detection machine-learning model 304 can use various acts and algorithms as part of identifying both the location data 310 and the object-content data 318. For example, to identify the location data 310 and/or the object-content data 318 of a document object, the object-detection machine-learning model 304 detects the document object by identifying the metes and bounds of the document object. For instance, the object-detection machine-learning model 304 can use one or more neural networks such as a convolutional neural network that can predict boundaries for document objects within a digital document image.

In some embodiments, the section reflow system 106 can train the object-detection machine-learning model 304 to predict identify and predict boundaries of document objects based on ground truth data (e.g., labeled document objects with labeled boundaries). For example, the section reflow system 106 can utilize a neural network to analyze training data comprising document objects with unidentified document-object boundaries. In turn, the neural network can generate predictions for the document objects and boundaries in the training data. Based on a comparison between the predictions objects and boundaries and the ground truth objects and boundaries (e.g., by applying a loss function), the section reflow system 106 can learn to identify objects and document-object boundaries by backpropagating a measure of loss reflecting differences between the boundary predictions and the ground truth data.

In yet another example, the object-detection machine-learning model 304 can utilize optical character recognition, optical word recognition, etc. to identify textual objects. Thus, the object-detection machine-learning model 304 can use a variety of acts and algorithms to detect document objects at the document-object identification 308.

In addition to the object-detection machine-learning model 304 detecting the document objects, the object-detection machine-learning model 304 can identify the location data 310 and the object-content data 318. With respect to the location data 310, for example, the object-detection machine-learning model 304 may determine an upper bounding portion of a detected document as corresponding to an upper boundary 312, a lower bounding portion of a detected document object as corresponding to a lower boundary 314 of a document object, and the document page(s) of the detected document object as corresponding to a page range 316. In these or other embodiments, the location data 310 may further include side boundaries and other suitable location information determined in a same or similar manner. Additionally, in some implementations, the object-detection machine-learning model 304 may compare the metes and bounds of the detected document objects to locations on the document page (e.g., coordinate locations as described more below in relation to FIGS. 5A-5C). As an example, the object-detection machine-learning model 304 may determine a first coordinate location of a document page as referencing a first portion (e.g., the upper boundary 312) of a document object, and a second coordinate location of a document page as referencing a second portion (e.g., the lower boundary 314) of the document object. Additionally or alternatively, in some embodiments, the object-detection machine-learning model 304 utilizes object-specific acts and algorithms to determine the location data 310 of a document object. For example, given a detected table (or to search for a table) as a document object, the object-detection machine-learning model 304 can utilize the sparse-line property of tables to identify table boundaries.

Similar to the location data 310, the object-detection machine-learning model 304 can identify the object-content data 318 for detected document objects. In particular, identifying the object-content data 318 comprises identifying the contents of the detected document objects and/or metadata associated with the detected document object. Accordingly, the textual data 320 of a detected document object comprises glyphs, words, or other text (e.g., represented as vector graphics). Additionally or alternatively, the textual data 320 may include generated and/or extracted metadata (e.g., a font size, indentation, etc.) associated with the textual content of a detected document object. Likewise, the image data 322 of a detected document object comprises image content (e.g., represented as a raster or bitmap) and/or metadata (e.g., dots per inch) associated with the image content. In addition, the table data 324 of a detected document object comprises table values, table inputs/variables, etc. and/or table metadata (e.g., row/column data).

To determine the textual data 320, the image data 322, and/or the table data 324, the section reflow system 106 may cause the object-detection machine-learning model 304 to analyze the contents of the detected document objects and/or return (i.e., output) the identified contents. In some implementations involving analysis to determine the textual data 320, the image data 322, and/or the table data 324, the object-detection machine-learning model 304 may utilize various acts and algorithms specific to the different types of document objects.

Additionally or alternatively, the section reflow system 106 can cause the object-detection machine-learning model 304 to determine the textual data 320, the image data 322, and/or the table data 324 by returning the identified contents from the digital document 302. Specifically, the object-detection machine-learning model 304 may reproduce, store, and/or transmit content from a detected document object. As an example, the object-detection machine-learning model 304 may utilize optical character recognition, optical word recognition, etc. to generate the textual data 320 comprising a representation of identified textual content. Further, in some embodiments, the object-detection machine-learning model 304 may mix and match acts and algorithms to more fully identify the content of a document object. For example, the object-detection machine-learning model 304 may utilize a convolutional neural network to analytically identify the image data 322 of a document object in addition to optical character recognition to return text-based portions within the image as metadata for the image.

Additionally or alternatively to utilizing the object-detection machine-learning model 304 to determine the location data 310 and/or the object-content data 318 as just described, the section reflow system 106 may utilize a heuristic model or other rules-based approach to determining the location data 310 and/or the object-content data 318. For example, to determine the location data 310 under a heuristic approach, the section reflow system 106 may utilize grid-scanning process in which the section reflow system 106 overlays a virtual grid of configurable resolution onto each document page in the digital document 302. For each segment (e.g., square, rectangle, etc.) in the grid that does not include whitespace, the section reflow system 106 can assign (e.g., by proximity) a non-whitespace segment as corresponding to a document object. In the event the section reflow system 106 detects a whitespace segment surrounded by non-whitespace segments, the section reflow system 106 may nonetheless assign the whitespace segment to the document-object that corresponds to the surrounding non-whitespace segments. Moreover, by utilizing such a grid-scanning process, the section reflow system 106 can identify the upper boundary 312 of a document object as corresponding to a separating grid-line between non-whitespace segments that are adjacent to whitespace segments at a top portion of the document object. Similarly, the section reflow system 106 can identify the lower boundary 314 of a document object as corresponding to a separating grid-line between the non-whitespace segments that are adjacent to whitespace segments at a bottom portion of the document object. Additionally, the section reflow system 106 can determine the page range 316 based on the number of pages that the non-whitespace segments span between the upper boundary 312 and the lower boundary 314.

Similarly, under a heuristic approach to determine the object-content data 318, the section reflow system 106 may compare font size, numbering, lettering, underlining, bolding, italics, spacing, paragraph styles, etc. to predetermined thresholds and/or attributes for determining the textual data 320 (e.g., to determine a heading versus a subheading versus paragraph text). Additionally or alternatively, the section reflow system 106 may determine whether there are horizontal and/or vertical lines separating alphanumeric values, and if so, determine that the alphanumeric values correspond to the table data 324. Additionally or alternatively, the section reflow system 106 may perform one or more tests to determine whether content of a document object is a vector graphic, and if so, determine that the content therein is either the textual data 320 or the table data 324. Additionally or alternatively, the section reflow system 106 may perform one or more tests to determine whether content of a document object is a raster image. For example, the section reflow system 106 may compare an amount of detected noise or blur (e.g., at a preset magnification) to a predetermined threshold. If the detected noise or blur satisfies (e.g., exceeds) the predetermined threshold, the content of the document object may correspond to the image data 322. As another example, the section reflow system 106 may apply a test glyph or other edit to the document object. If unable to do so, the section reflow system 106 may identify the content of the document object as corresponding to the image data 322. Otherwise, the section reflow system 106 may identify the content of the document object as corresponding to either the textual data 320 or the table data 324, and the section reflow system 106 can remove/undo the applied test glyph or edit. Myriad other heuristic approaches are herein contemplated.

From obtaining the textual data 320, the image data 322, and/or the table data 324, the object-detection machine-learning model 304 can then determine document-object identifiers 326 as representative of a document object or a document section (i.e., multiple document objects or a single document object). In some embodiments, the object-detection machine-learning model 304 intelligently selects the document-object identifiers 326 based on one or more analyses of candidate document-object identifiers included in the textual data 320, the image data 322, and/or the table data 324. As an example, the section reflow system 106 may utilize the object-detection machine-learning model 304 as a classification neural network trained to predict/recommend the document-object identifiers 326 from a set of candidate document-object identifiers as representative of the textual data 320, the image data 322, or the table data 324 of a given document object (or multiple document objects).

To train such a classification neural network to predict/recommend the document-object identifiers 326, the section reflow system 106 can compare a predicted document-object identifier with ground truth data (e.g., observed data) to determine a loss using a loss function. In these or other embodiments, the loss function can include, but is not limited to, a regression loss function (e.g., a mean square error function, a quadratic loss function, an L2 loss function, a mean absolute error/L1 loss function, mean bias error). Additionally, or alternatively, the loss function can include a classification loss function (e.g., a hinge loss/multi-class SVM loss function, cross entropy loss/negative log likelihood function). Further, the loss function can return quantifiable data (e.g., probability values, confidence scores, etc.) regarding the difference between the predicted document-object identifier and ground truth data. Based on this determined loss, the section reflow system 106 can adjust various parameters/hyperparameters to improve the quality/accuracy of a predicted document-object identifier in subsequent training iterations—by narrowing the difference (e.g., increasing a probability value) between the predicted document-object identifier and ground truth data.

In other embodiments, the section reflow system 106 can utilize a heuristic approach to generate the document-object identifiers 326. For example, the section reflow system 106 can analyze spacing, formatting, or alignment of the contents of a digital document utilizing particular rules to identify document sections. To illustrate, the section reflow system 106 can identify header objects based on formatting (e.g., bold, underlining, all caps) or alignment (e.g., further to the left than other paragraphs, separate from other text paragraphs). Similarly, the section reflow system can identify a table (e.g., based on alignment or lines of a table), image (e.g., based on an embedded image file type or non-text contents), or a table header (e.g., based on a position, formatting, or alignment at the top of a table). In addition, the section reflow system 106 can identify document sections utilizing similar heuristic rules (e.g., identify sections as text between header objects). Additionally or alternatively, the section reflow system 106 may extract portions from topic sentences, summary statements, abstracts, or words that follow certain terms or phrases (e.g., "in conclusion," "in summary," etc.). As another example, the section reflow system 106 can extract an image caption or metadata corresponding to a document object comprising an image.

In some embodiments, the section reflow system 106 identifies document sections as the identified document objects. In other embodiments, the section reflow system 106 can combine identified document objects into document sections. To illustrate, the section reflow system 106 can identify a document object comprising a header and another document object comprising a text block. In turn, the section reflow system 106 can combine the header and the text block as a document section. In some embodiments, the section reflow system 106 utilizes the object-detection machine-learning model 204 to automatically identify sections (e.g., sections that include a combination of individual document objects).

In some implementations the section reflow system 106 can combine document objects to define a document section based on a semantic similarity. For example, the section reflow system 106 may compare a first document-object identifier for a first document object with a second document-object identifier for a second document object. If the comparison indicates a semantic similarity greater than a threshold similarity, then the section reflow system 106 may combine the first document object and the second document object as a document section.

Additionally or alternatively, the section reflow system 106 can combine document objects to define a document section based on document-object priorities and the positional arrangement of document objects. For example, the section reflow system 106 may assign a higher document-object priority to a document object comprising a header. In addition, the section reflow system 106 may assign a lower document-object priority to a document object comprising a text block. Then, to group the document objects based on document-object priorities, the section reflow system 106 can group together adjacent document objects with lower document-object priorities. The section reflow system 106 can assign this grouping of document objects with lower document-object priorities as corresponding to a document object that includes both a higher document-object priority and a preceding positional arrangement. In this example, the grouping of document objects with lower document-object priorities combined with the document object of higher document-object priority comprise a document section. In this manner, the section reflow system 106 can prioritize (e.g., rank) document objects and create document sections with document objects based on document-object priorities.

In addition to identifying document sections, the section reflow system 106 can also identify document subsections. In some embodiments, the section reflow system 106 identifies document subsections as the identified document objects. In other embodiments, the section reflow system 106 can combine identified document objects into document subsections in a same or similar manner as described above in relation to identifying document sections. For example, the section reflow system 106 can utilize a machine learning model that identifies sections and sub-sections. Similarly, the section reflow system 106 can apply heuristic rules to identify sub-sections (e.g., a header object with different formatting, different hierarchical text of an outline, and/or alignment further to the right indicates a sub-section).

As an example of identifying document subsections, the section reflow system 106 can identify a first document object comprising a first header, a second document object comprising a second header, a third document object comprising a first text block, a fourth document object comprising a third header, and a fifth document object comprising a second text block. In turn, the section reflow system 106 can combine the second header and the first text block as a first document subsection. Likewise, the section reflow system 106 can combine the third header and the second text block as a second document subsection. In addition, the section reflow system 106 can combine the first header with the first document subsection and the second document subsection as a document section.

After identifying document objects, document sections, and/or document subsections, the section reflow system 106 can populate the table of contents 328. To do so, the section reflow system 106 can arrange the document-object identifiers 326 in the order of represented document objects or document sections/subsections as positionally detected in the digital document 302 (e.g., according to the location data 310). For example, in reference to the table of contents 328 in FIG. 3A, the document-object identifier of "2.1.1 Page Description Languages" represents a first document object (or document subsection), and the document-object identifier of "2.1.2 Adobe Imaging Model" represents a second document object (or document subsection) positioned subsequent to the first document object within the digital document 302. Additionally or alternatively, the section reflow system 106 can arrange the document-object identifiers 326 in a grouping of represented document objects as determined from the location data 310 and/or the object-content data 318. For example, referencing the table of contents 328 in FIG. 3A again, the section reflow system 106 arranges the document-object identifier of "2.1 Imaging Model" as a document section to include a grouping of four discrete document objects (or document subsections) 2.1.1-2.1.4 in accordance with the location data 310 and/or the object-content data 318.

Figure 3A:
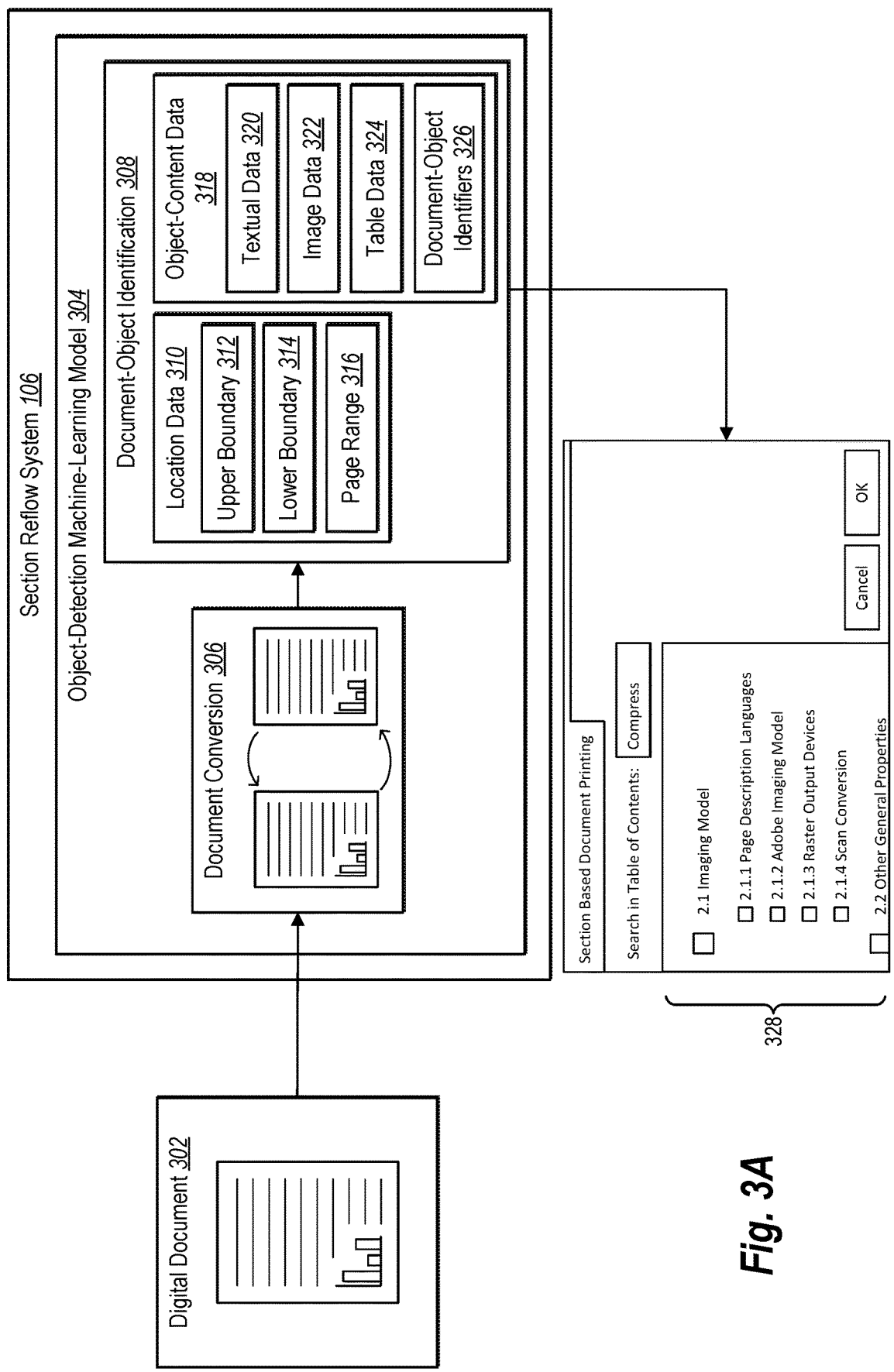
FIG. 3A illustrates a section reflow system utilizing an object-detection machine-learning model to generate a table of contents in accordance with one or more embodiments.

In these or other embodiments, the section reflow system 106 can utilize different configuration(s) and/or component(s) than that illustrated in FIG. 3A to generate the table of contents 328. For example, in some embodiments, the section reflow system 106 implements the document conversion 306 using a different component than the object-detection machine-learning model 304, while in other embodiments, the section reflow system 106 omits the document conversion 306 altogether. Similarly, and as described above, in some embodiments, the section reflow system 106 may not utilize a machine-learning model to perform one or more portions of the document-object identification 308. For example, in some implementations, the section reflow system 106 utilizes a heuristic model to generate the location data 310 and/or the object-content data 318 to use for creating the table of contents 328.

As mentioned above, the section reflow system 106 can provide a table of contents within a user-friendly printing user interface of a computing device for receiving user input to identify document sections to selectively print. Based on the selected document sections, the section reflow system 106 can then generate a modified digital document comprising the selected document sections for efficient printing and increased readability. FIG. 3B illustrates the section reflow system 106 generating a modified digital document 354 based on user input to selectively print document sections in accordance with one or more embodiments. As shown, the section reflow system 106 can provide a printing user interface 330 comprising the table of contents 328 generated as described above in relation to FIG. 3A. Based on a user selection 332 of one or more document sections at the printing user interface 330, the section reflow system 106 can remove one or more unselected document sections at act 340 and reposition the one or more selected document sections at act 342 to generate the modified digital document 354. These and other aspects are now described in further detail.

Figure 3B:
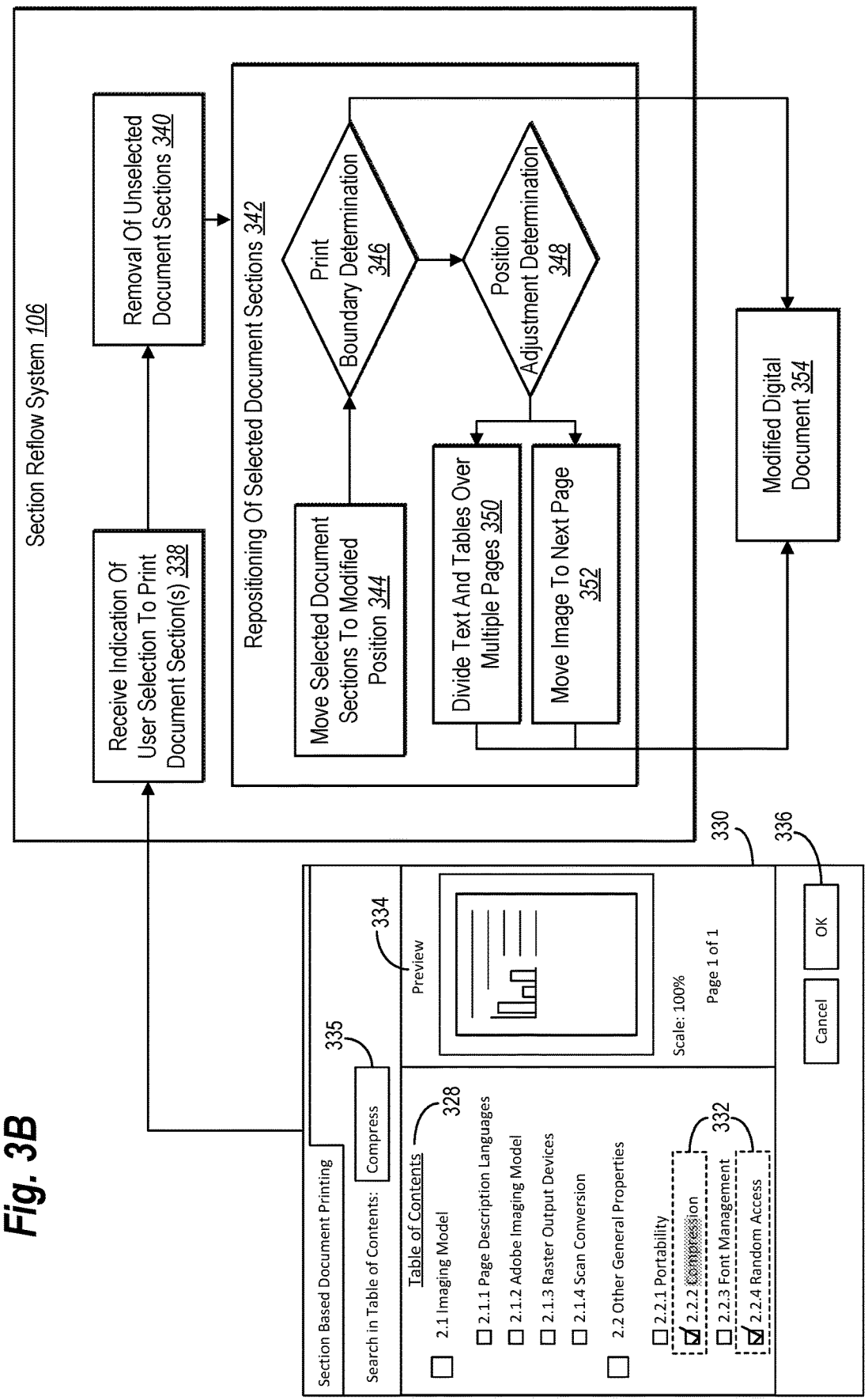
FIG. 3B illustrates a section reflow system generating a modified digital document based on user input to selectively print document sections in accordance with one or more embodiments.

As shown in FIG. 3B, the printing user interface 330 comprises the table of contents 328, a print preview 334, a search bar 335, and a selectable option 336. In particular, the printing user interface 330 comprises the table of contents 328 with document sections (and sub-sections) indicated as selectable printing elements identified according to their document-object identifiers as discussed above. Additionally or alternatively to the document sections being selectable printing elements, the printing user interface 330 in some embodiments includes an input field (not shown) that is configured to receive alphanumeric characters indicating a user selection of a document section. For example, in response to receiving a user input to place a cursor in the input field, the printing user interface may receive user inputs at the input field that list a range of the desired document sections for printing as comma-separated values (e.g., "Section 1, Section, 1.2.1, Section 3").

In response a user selection of a document section (e.g., as shown by the user selection 332), the section reflow system 106 can dynamically update one or more portions of the printing user interface 330. For example, in response to the user selection 332, the section reflow system 106 can update the print preview 334 to reflect an approximate or predicted version of the modified digital document 354. In addition, the section reflow system 106 can update the table of contents 328 to indicate which document sections are selected for printing. For example, the section reflow system 106 can cause a computing device displaying the printing user interface 330 to indicate checked boxes, bolded font, or some other visual indicator representing user selection of document sections.

Similarly, in response to a user input to provide a search query at the search bar 335, the section reflow system 106 can update the table of contents 328 to highlight or otherwise visually indicate which document sections include or relate to the search query. For example, in response to receiving the search query "Compress" at the search bar 335 as shown in FIG. 3B, the section reflow system 106 updates the table of contents 328 to highlight the term "Compress" in the document section identified as "2.2.2 Compression."

Moreover, in response to the user selection 332 selecting one or more document sections, the section reflow system 106 can generate the modified digital document 354. Specifically, in response to a user input at the selectable option 336 confirming the user selection 332, the section reflow system 106 can reflow the selected document sections to generate the modified digital document 354. Indeed, as illustrated at an act 338 in FIG. 3B, the section reflow system 106 receives an indication of the user selection 332 to print the selected document sections. In turn, at an act 340, the section reflow system 106 removes one or more document objects corresponding to unselected document sections. Moreover, at an act 342, the section reflow system 106 repositions one or more document objects corresponding to the one or more selected document sections.

In more detail, the section reflow system 106 at the act 340 can remove the one or more unselected document sections by utilizing one or more cropping actions. For example, the section reflow system 106 may select one or more portions to crop in the digital document image converted from the digital document 302. Specifically, the section reflow system 106 may determine portions to crop based on the location data 310. For instance, the section reflow system 106 can crop a portion of the digital document 302 between the upper boundary 312 and the lower boundary 314 of an unselected document section. In this manner, the section reflow system 106 can remove the unselected document sections (which in the case of FIG. 3B, are document sections 2.1, 2.2.1, and 2.2.3).

After removing the one or more unselected document sections at the act 340, the section reflow system 106 can perform the act 344 by moving one or more document objects corresponding to the selected document sections (e.g., document sections 2.2.2 and 2.2.4). As described in greater detail in FIGS. 5A-5C, 7A-7B, and 8A-8B, the section reflow system 106 can shift the selected document sections corresponding to the user selection 332 upwards in the digital document. For instance, with document objects corresponding to document sections 2.1 and 2.2.1 removed, the section reflow system 106 can move document object(s) corresponding to the document section 2.2.2 to the top of a digital document image. Similarly, with document object(s) corresponding to the document section 2.2.3 removed, the section reflow system 106 can move document object(s) corresponding to the document section 2.2.4 adjacent to (e.g., immediately following) the document section 2.2.2. Therefore, in some implementations, the act 344 comprises replacing whitespace that results from the removal of the document objects corresponding to the unselected document sections at act 342.

In addition to moving the selected document sections to a modified position, the section reflow system 106 performs a print boundary determination 346 to check whether modified positions of the selected document sections satisfy print boundaries. For example, the section reflow system 106 may utilize print boundaries of a printing device or a computing device. In particular, the section reflow system 106 may analyze portions of the digital document to determine whether content has exceeded the print boundaries.

If the section reflow system 106 determines a modified position of a document object satisfies the print boundaries, the section reflow system 106 may leave the document object in its modified position for generating the modified digital document 354. On the other hand, if the section reflow system 106 determines a modified position of a document object fails to satisfy the print boundaries, the section reflow system 106 can perform a position adjustment determination 348. In these or other embodiments, the section reflow system 106 may perform the print boundary determination 346 for each document object of the selected document sections, beginning with the first (i.e., top-most) document object in the digital document image and moving sequentially downward. In so doing, the section reflow system 106 can avoid excessive, repetitive movements of individual sections as well as printing-boundary errors.

As just mentioned, if the section reflow system 106 determines a modified position of a document object fails to satisfy the print boundaries, the section reflow system 106 can proceed to the position adjustment determination 348. Specifically, at the position adjustment determination 348, the section reflow system 106 can determine how to adjust the positioning of the document objects based on the type of document object. For instance, if the object-content data 318 of a document object indicates that the document object comprises text or a table, the section reflow system 106 can divide the text or table between pages.

For example, the section reflow system 106 can determine a dividing point in the text or table based on where the printing boundary cuts off the content of the document object. For example, determining a dividing point in the text or table may include determining a first portion that fits on a first page and a second portion that fits on a second page. In these or other embodiments, the first portion that fits on the first page may include part of the text or table that fits inside of a printing boundary of the first page. In addition, the second portion may include part of the text or table that does not fit inside of the printing boundary of the first page. In particular, the second portion may include part of the text or table that fits inside of the printing boundary of the second page. Moreover, the section reflow system 106 may identify the dividing point as corresponding to a location in the text or table between where the first portion ends and the second portion begins.

At an act 350, as shown in FIG. 3B, the section reflow system 106 divides the document object over multiple pages according to the determined dividing point. In some embodiments, the section reflow system 106 can divide different document objects utilizing different approaches at the act 350. For example, in dividing a table, the section reflow system 106 can divide table contents, while repeating portions of the table across pages. To illustrate, the section reflow system 106 can identify a dividing point of a table where the table exceeds a print boundary. The section reflow system 106 can divide the table at the dividing point, but repeat a header row of the table at a second page. Thus, the section reflow system 106 can provide a header row on each page comprising the table to improve readability.

As mentioned above, in some embodiments, the section reflow system 106 identifies document objects that are indivisible. In such circumstances the system can move the document objects to the next page. For example, if the object-content data 318 of a document object indicates that the document object comprises an image, the section reflow system 106 can proceed to an act 352 and move the image to the next page. In some embodiments, section reflow system 106 can perform the act 352 with regard to additional digital objects that should not be divided, such as headers, or short tables (e.g., tables that do not satisfy a threshold length).

The section reflow system 106 can iteratively move document sections, identify print boundaries, and adjust subsequent document sections, until analyzing and reflowing all document sections selected for printing. Thus, removing unselected document sections at the act 340 and repositioning the selected document sections at the act 342, the section reflow system 106 can generate the modified digital document 354.

Figure 4A:
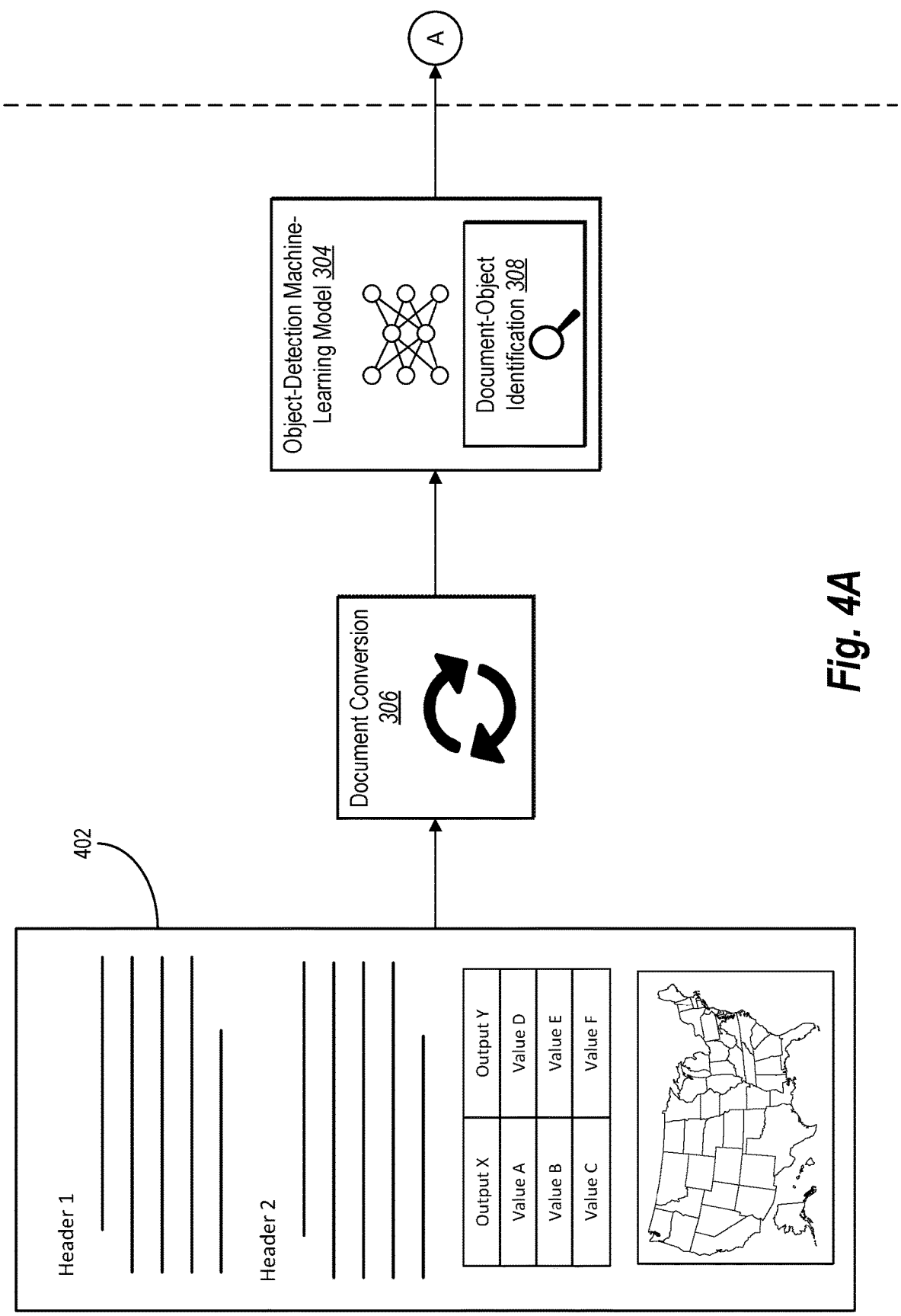
FIGS. 4A-4B illustrate a section reflow system utilizing an object-detection machine-learning model to generate a table of contents within a printing user interface in accordance with one or more embodiments.
Figure 4B:
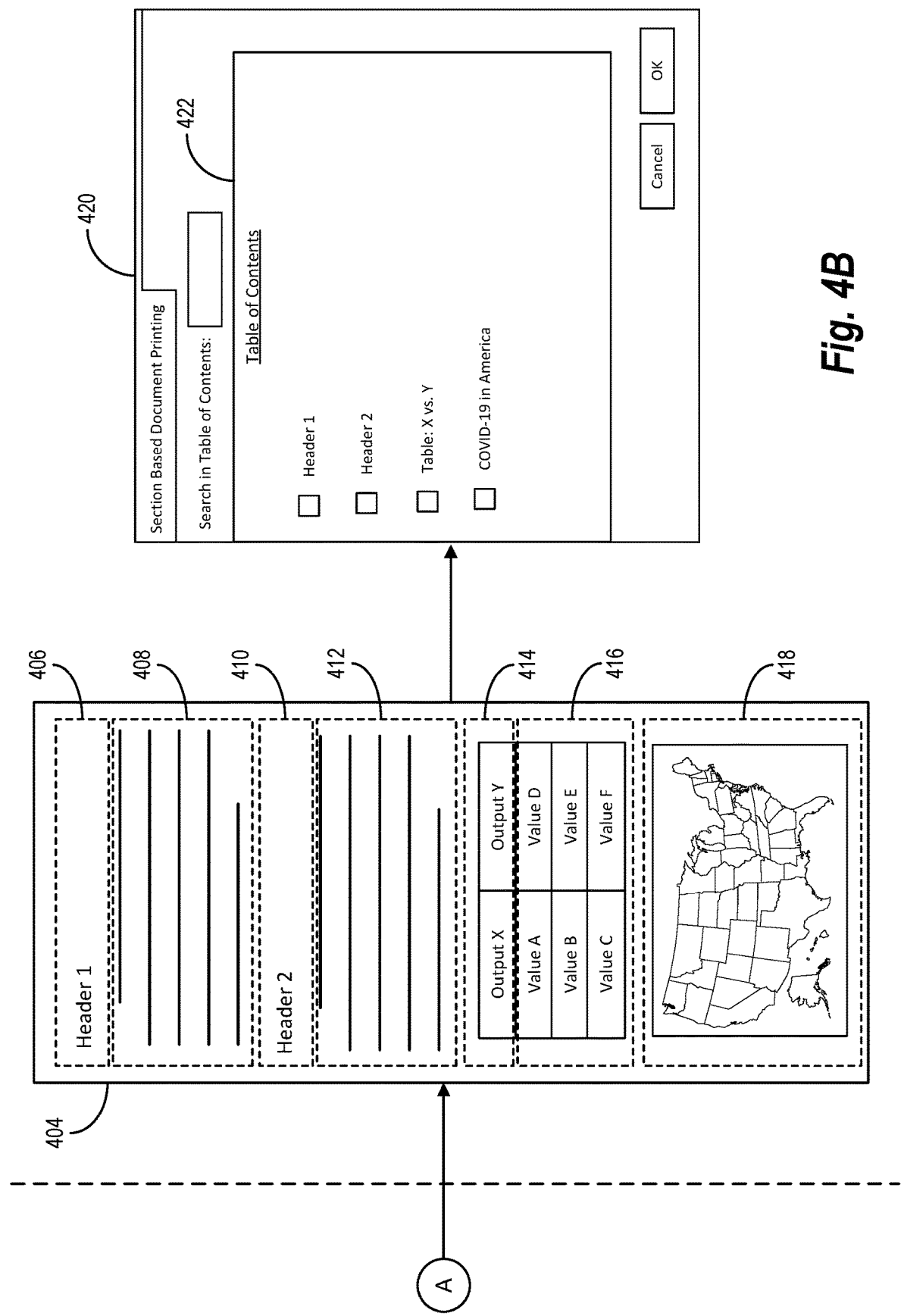

As mentioned above, the section reflow system 106 can convert a digital document into a digital document image and intelligently perform document-object identification. In turn, the section reflow system 106 can generate a table of contents for providing in a printing user interface. FIGS. 4A-4B illustrate the section reflow system 106 utilizing the object-detection machine-learning model 304 to generate a table of contents 422 within a printing user interface 420 based on an example digital document 402 in accordance with one or more embodiments. As shown in FIG. 4A specifically, the section reflow system 106 performs a document conversion 306 to convert the digital document 402 to a digital document image as described above in relation to FIG. 3A. In turn, the section reflow system 106 can direct the object-detection machine-learning model 304 to perform document-object identification 308 as also described above in relation to FIG. 3A. In so doing, the section reflow system 106 can identify discrete document objects from the digital document 402 as shown in more detail in FIG. 4B.

In particular, FIG. 4B illustrates the section reflow system 106 utilizing the object-detection machine-learning model 304 to identify document objects 406-418 within a digital document image 404. Moreover, FIG. 4B illustrates how the section reflow system 106 generates the table of contents 422 from the document objects 406-418 for providing in the printing user interface 420. That is, the section reflow system 106 arranges the table of contents 422 to include document sections based on the document objects 406-418 and their corresponding location data and object-content data as described above in relation to FIG. 3B.

In more detail, the section reflow system 106 can identify the document objects 406-418 by identifying location data of the document objects 406-418. In particular, the section reflow system 106 can identify the upper and lower boundaries of the document objects 406-418 within the digital document image 404. For example, utilizing a machine-learning model and/or a heuristic approach discussed above, the section reflow system 106 can identify the metes and bounds of each of the document objects 406-418.

In addition, the section reflow system 106 can identify the document objects 406-418 by identifying object-content data. In particular, the section reflow system 106 can identify textual data, image data, and/or table data for each of the document objects 406-418. For example, utilizing a machine-learning model and/or heuristic methods described above, the section reflow system 106 can reproduce, extract, store, and/or transmit content from the document objects 406-418.

With the identified document objects, the section reflow system 106 can determine document sections as described above in relation to the foregoing figures. For example, in some embodiments, the section reflow system 106 identifies document sections as the identified document objects 406-418. In other embodiments, the section reflow system 106 can combine identified document objects 406-418 into document sections. To illustrate, the section reflow system 106 can identify document objects 406-408 as a first document section, document objects 410-412 as a second document section, document objects 414-416 as a third document section, and document object 418 as a fourth document section. For example, the object-detection machine-learning model 204 can identify document sections comprising the foregoing document objects.

In addition, the section reflow system 106 can determine document-object identifiers for presentation of the identified document sections in the table of contents 422. For example, utilizing a machine-learning model and/or heuristic approach, the section reflow system 106 can predict/recommend the document-object identifiers as representative of the textual data, the image data, and/or the table data of the identified document objects 406-418. Thus, the section reflow system 106 can identify the document sections as corresponding to "Header 1," "Header 2," "Table: X vs. Y," and "COVID-19 in America."

With the document-object identifiers, the section reflow system 106 arranges the table of contents 422 based on the location of the document objects 406-418 in the digital document image 404. For instance, the section reflow system 106 sequentially arranges document-object identifiers for the document sections in the table of contents 422 of "Header 1," "Header 2," "Table: X vs. Y," and "COVID-19 in America" according to the order (e.g., page arrangement) of the document objects 406-418 in the digital document image 404. In some embodiments, the section reflow system 106 can determine the order of the document objects 406-418 in the digital document image 404 based on respective metes and bounds identified at the document-object identification 308 according to acts and algorithms described above in relation to FIG. 3A. For instance, the section reflow system 106 can use coordinate locations referencing upper/lower boundaries of the document objects 406-418 in the digital document image 404 to determine a presentation order (e.g., first, second, third, and so forth) of document sections in the table of contents 422.

In addition, the section reflow system 106 arranges the table of contents 422 based on the object-content data of the document objects 406-418 in the digital document image 404. Specifically, as described in relation to FIG. 3A, the section reflow system 106 can determine document-object identifiers for the document objects 406-418 in the digital document image 404. For example, the section reflow system 106 can determine that the document-object identifier of "Header 1" represents both the header text in the document object 406 and the text of the document object 408. Similarly, the section reflow system 106 can determine that the document-object identifier of "Header 2" represents both the header text in the document object 410 and the text of the document object 412. Further, the section reflow system 106 can determine that the document-object identifier of "Table: X vs. Y" represents a table comprised of the header row (document object 414) with output variables X and Y in addition to corresponding table values (document object 416). Further, the section reflow system 106 can determine that the document-object identifier of "COVID-19 in America" represents an image of the United States of America as it relates to the corona virus disease that began spreading in the year 2019 (e.g., based on metadata for the image). Thus, the section reflow system 106 also arranges the table of contents 422 based on the object-content data of the document objects 406-418 by using document-object identifiers representative of object content.

Figure 5A:
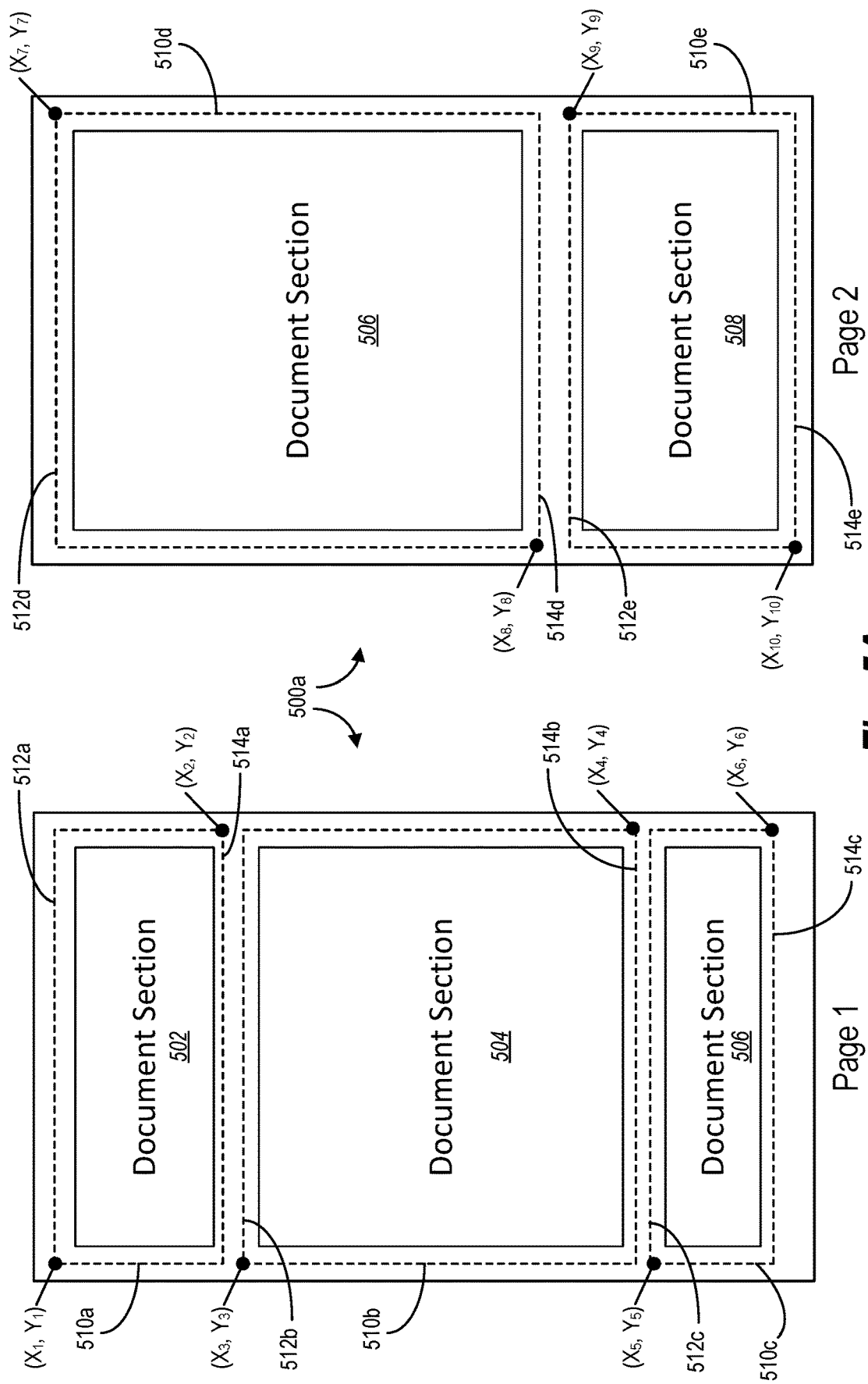
FIGS. 5A-5C illustrate a section reflow system utilizing coordinate locations of document sections to generate a modified digital document in accordance with one or more embodiments.
Figure 5B:
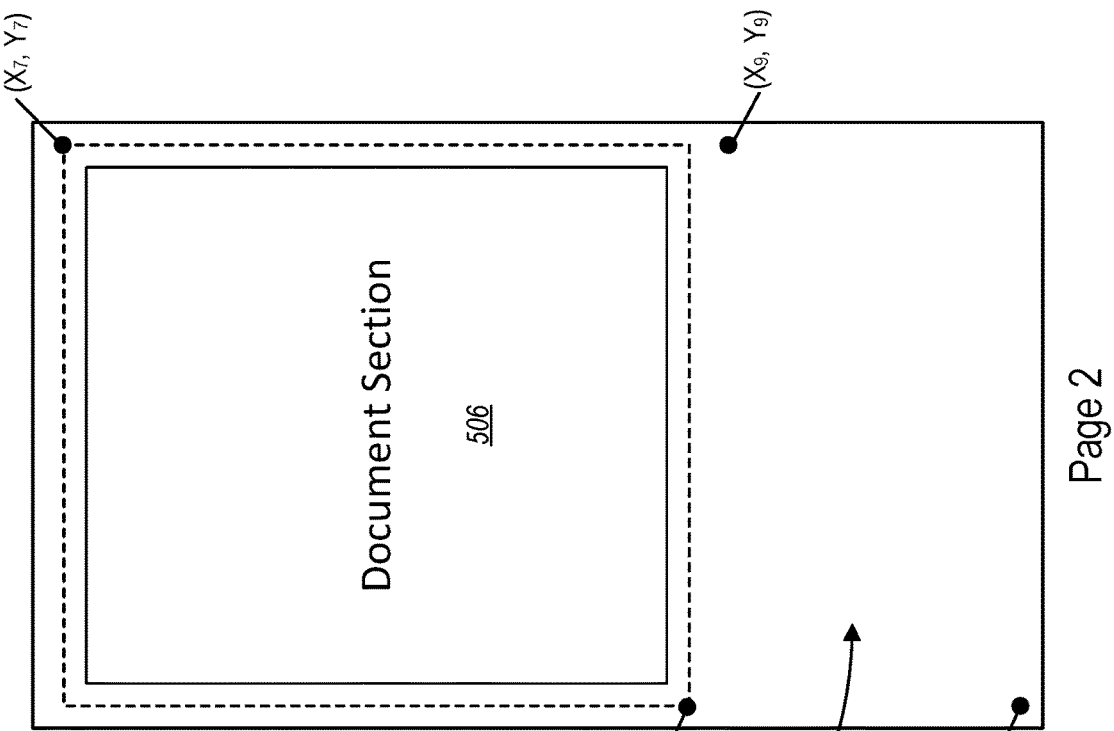
Figure 5B:
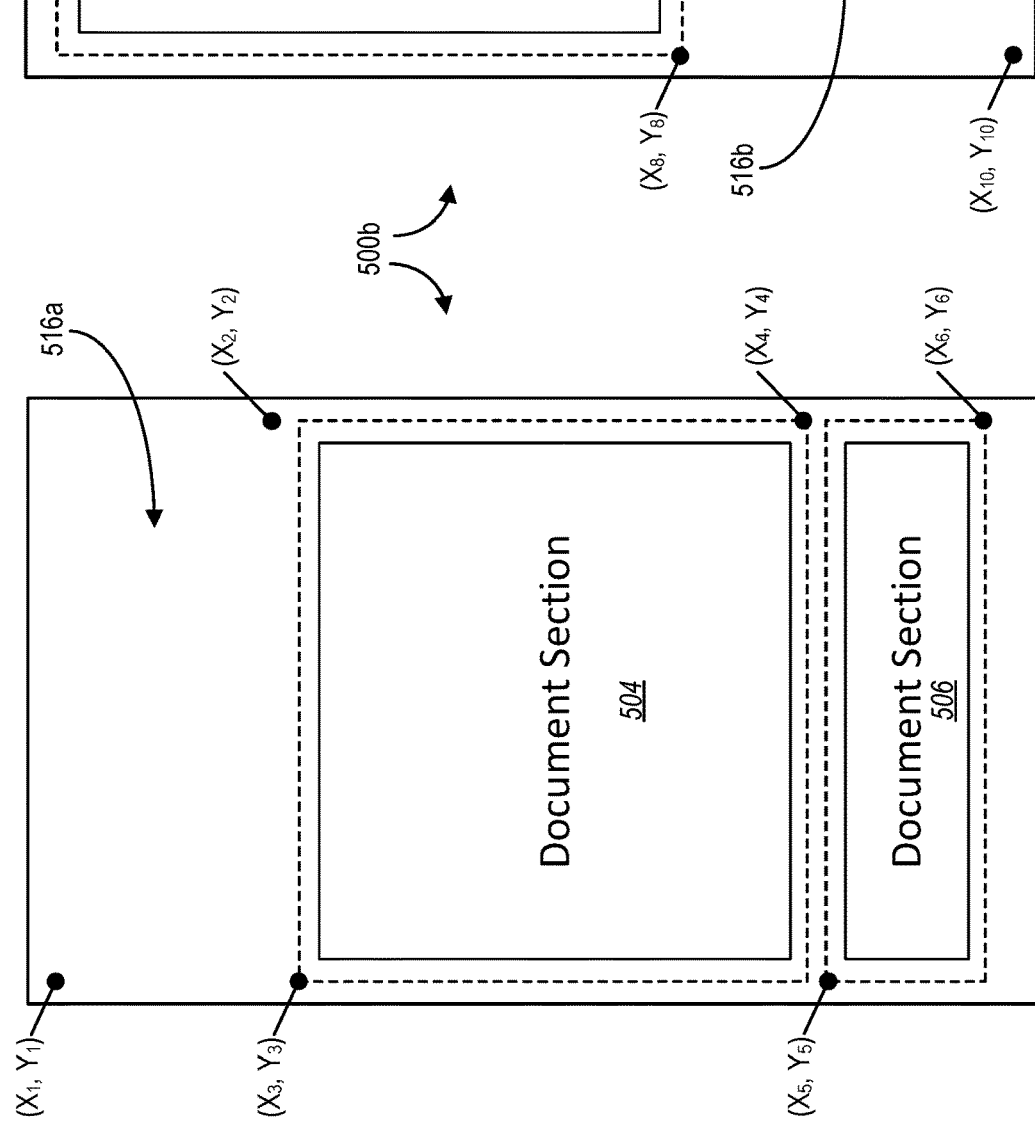
Figure 5C:
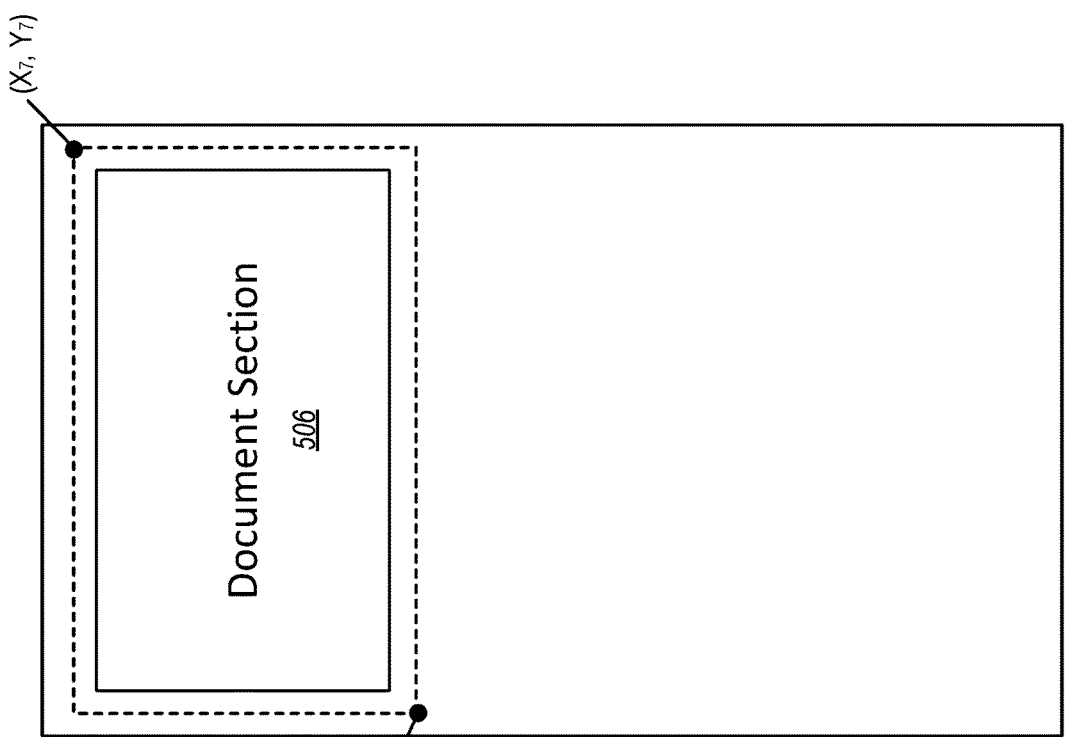
Figure 5C:
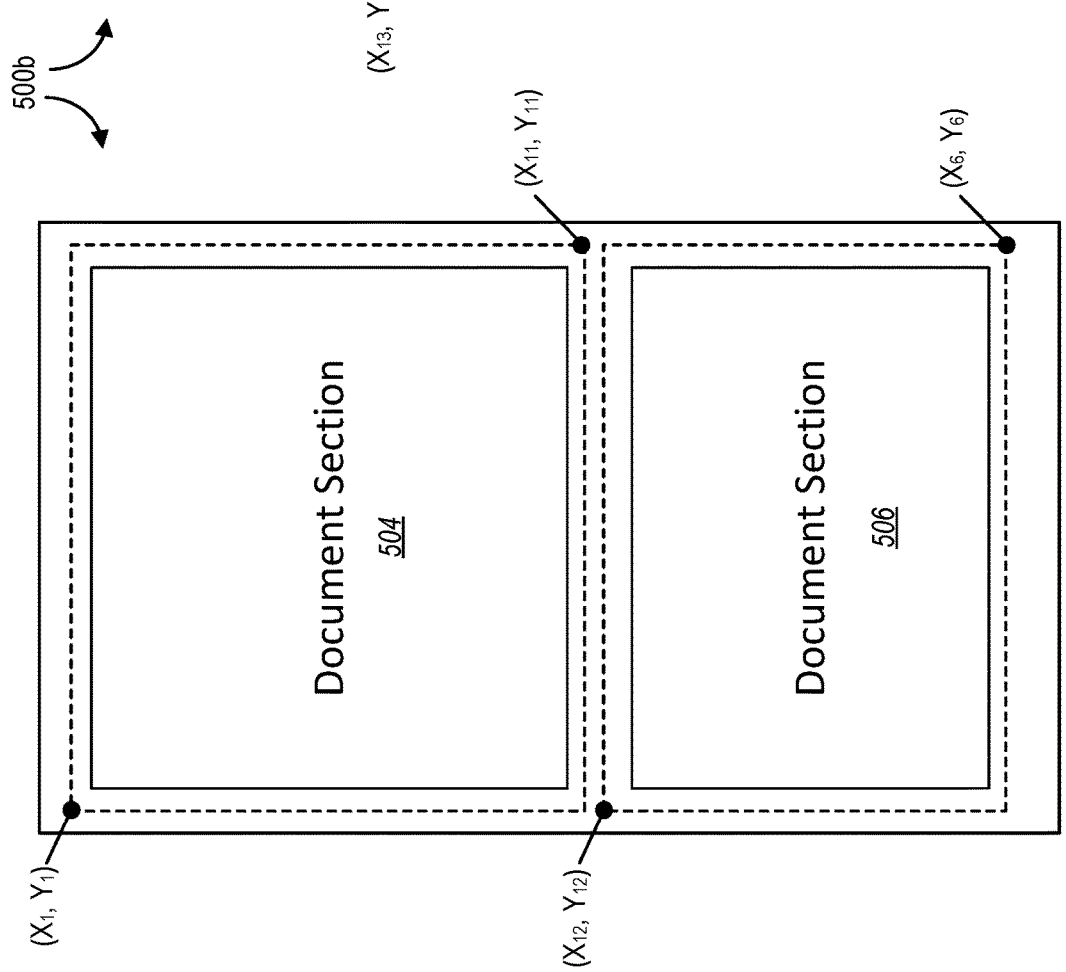

As mentioned above, the section reflow system 106 can utilize location data of identified document objects to generate a modified digital document. FIGS. 5A-5C illustrate the section reflow system 106 utilizing coordinate locations of document sections 502-508 to generate a modified digital document in accordance with one or more embodiments. As shown in FIG. 5A, a digital document 500a (i.e., a digital document image) comprises the document sections 502-508 identified according to one or more acts or algorithms described above in relation to FIG. 3B for document-object identification. In addition, FIG. 5A illustrates two consecutive pages (page 1 and page 2) of the digital document 500a with the document sections 502-508 comprising respective boundaries 510a-510e.

In these or other embodiments, the coordinate locations described above in relation to FIG. 3A can correspond to the boundaries 510a-510e. For example, with respect to the document section 502, the coordinate location $(x_1, y_1)$ references an upper boundary portion 512a of the boundary 510a, and the coordinate location $(x_2, y_2)$ references a lower boundary portion 514a of the boundary 510a. Similarly, with respect to the document section 504, the coordinate location $(x_3, y_3)$ references an upper boundary portion 512b of the boundary 510b, and the coordinate location $(x_4, y_4)$ references a lower boundary portion 514b of the boundary 510b. For a first portion of the document section 506 on page 1, the coordinate location $(x_5, y_5)$ references an upper boundary portion 512c of the boundary 510c, and the coordinate location $(x_6, y_6)$ references a lower boundary portion 514c of the boundary 510c. Likewise, for a second portion of the document section 506 on page 2, the coordinate location $(x_7, y_7)$ references an upper boundary portion 512*d* of the boundary 510*d*, and the coordinate location $(x_5, y_5)$ references a lower boundary portion 514*d* of the boundary 510*d*. Further, for the document section 508, the coordinate location $(x_9, y_9)$ references an upper boundary portion 512*e* of the boundary 510*e*, and the coordinate location $(x_{10}, y_{10})$ references a lower boundary portion 514*e* of the boundary 510*e*.

In some embodiments, the section reflow system 106 can utilize more or fewer coordinate locations to reference and/or define a boundary of a document object in accordance with acts and algorithms described above in relation to FIG. 3A. However, utilizing at least two coordinate locations diagonally-positioned relative to each other, the section reflow system 106 can reference a horizontal width of a document object (e.g., $x_2-x_1$) and a vertical height of a document object (e.g., $y_2-y_1$).

As shown in FIG. 5B, in response to user selection of the document sections 504-506 at a printing user interface, the section reflow system 106 removes document section 502 and document section 508 to generate a modified digital document 500*b* that comprises document sections 504-506. From the removal of document section 502 and document section 508, the section reflow system 106 generates corresponding whitespace 516*a*-516*b*. Specifically, the whitespace 516*a* corresponds to where the document section 502 was previously positioned, and the whitespace 516*b* corresponds to where the document section 508 was previously positioned.

FIG. 5C then shows the section reflow system 106 repositioning the selected document sections 504-506 to a modified position within the modified digital document 500*b*. Indeed, relative to FIGS. 5A and 5B, FIG. 5C shows the section reflow system 106 moving the document section 504 from between the coordinate locations $(x_3, y_3)$ and $(x_4, y_4)$ to a modified position between the coordinate locations $(x_1, y_1)$ and $(x_{11}, y_{11})$. Likewise, FIG. 5C shows the section reflow system 106 moving both portions of document section 506 (e.g., by shifting up the document section 506).

In more detail, by moving document section 504 to the modified position between the coordinate locations $(x_1, y_1)$ and $(x_{11}, y_{11})$, the section reflow system 106 leaves an empty space. The section reflow system 106 can analyze the empty space resulting from moving the document section 504 to the modified position between the coordinate locations $(x_1, y_1)$ and $(x_{11}, y_{11})$. Based on the analysis, the section reflow system 106 can determine that the document section 506 cannot (in its entirety) fit within the empty space.

Accordingly, the section reflow system 106 can determine a new dividing point within the document section 506 for splitting the document section 506 into two portions between page 1 and page 2 of the modified digital document 500*b*. To determine the new dividing point for splitting the document section 506, the section reflow system 106 can determine a first portion that fits on page 1 within the printing boundary of page 1. Likewise, the section reflow system 106 can determine a second portion that fits on page 2. Based on the first portion and the second portion, the section reflow system 106 can identify the new dividing point in the document section 506 as corresponding to a location between where the first portion ends and the second portion begins.

With the new dividing point identified, the section reflow system 106 can move the document section 506 to a modified position spanning page 1 and page 2. Specifically, FIG. 5C illustrates the section reflow system 106 having positioned a modified first portion of the document section 506 at a modified position between the coordinate locations $(x_{12}, y_{12})$ and $(x_6, y_6)$, and a modified second portion at a modified position between the coordinate locations $(x_7, y_7)$ and $(x_{13}, y_{13})$. By repositioning the selected document sections 504-506 to a modified position within the modified digital document 500*b*, the section reflow system 106 removes the whitespace 516*a*-516*b* generated from removing the unselected document sections and consolidates the selected document sections into a more readable and efficient document for printing.

Figure 6B:
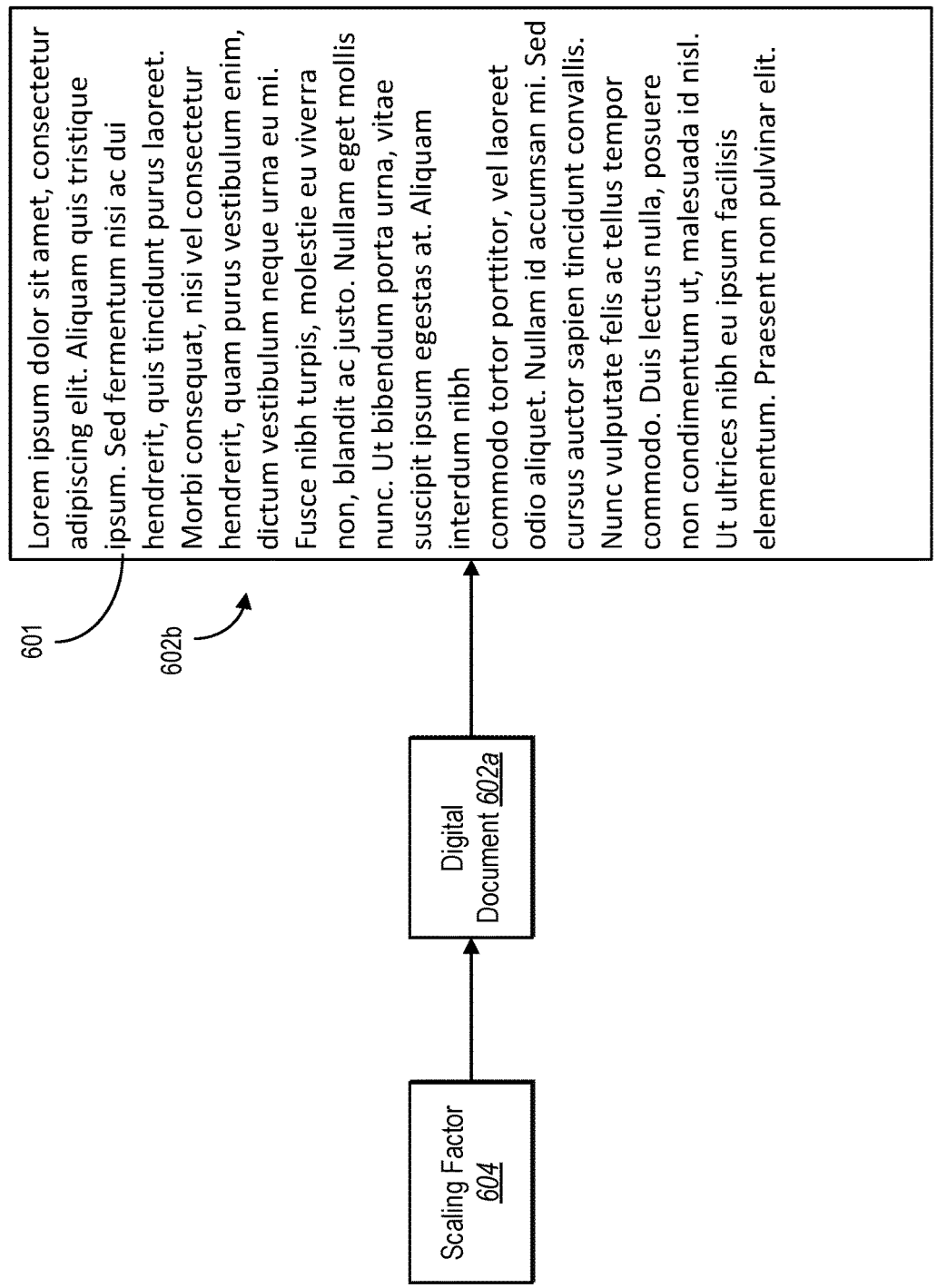

As mentioned above, in some embodiments, the section reflow system 106 can apply a scaling factors to generate a modified digital document. FIGS. 6A-6B illustrate applying a scaling factor to generate a modified digital document in accordance with one or more embodiments, In particular, FIG. 6A illustrates a digital document 602*a* (e.g., a digital document image) comprising an image object 600 and a text object 601. The text object 601 spans consecutive pages (page 1 and page 2) of the digital document 602*a*.

In response to a user input for selectively printing the text object 601, the section reflow system 106 can generate a modified digital document 602*b* by removing the image object 600. To remove the text object 601, the section reflow system 106 can utilize location coordinates or other location data identified according to heuristic and/or machine-learning model approaches described above. For example, the section reflow system 106 can crop a portion of the digital document image 602*a* between an upper and lower boundary of the image object 600.

In response to removing the image object 600, the section reflow system 106 can detect an empty space that results from removing the image object 600. In particular, the section reflow system 106 can detect a size of the empty space that results from removing the image object 600. To detect the size of the empty space, the section reflow system 106 can use the location data mentioned above for the image object 600. For instance, the section reflow system 106 can subtract coordinate locations for the image object 600 (e.g., a first y-coordinate referencing a top boundary minus a second y-coordinate referencing a bottom boundary). Thus, based on the difference in coordinate locations of the image object 600, the section reflow system 106 can detect a size of the empty space that results from removing the image object 600.

In addition, the section reflow system 106 can determine that the text object 601 does not fit within the empty space on the first page that results from removing the image object 600. To determine that the text object 601 does not fit within the empty space, the section reflow system 106 can use location data in a same or similar manner as just described for the image object 600. For instance, the section reflow system 106 can subtract coordinate locations for the text object 601. The section reflow system 106 can then compare the size of the text object 601 with the size of the image object 600 and any other remaining space on the page.

Additionally or alternatively to the foregoing, the section reflow system 106 can determine whether the text object 601 fits on page 1 by repositioning the text object 601 to fill the empty space from removal of the image object 600. After repositioning the text object 601 to fill the empty space, the section reflow system 106 can determine that the text object 601 does not fit on a single page (i.e., page 1).

In some embodiments, to fit a document object on a single page, the section reflow system 106 can apply a scaling factor to the document object. For example, as shown in FIG. 6B, the section reflow system 106 applies a scaling factor 604 to the digital document 602a to generate a modified digital document 602b. By applying the scaling factor 604 to the digital document 602a, the section reflow system 106 modifies the text object 601 to fit on a single page (in this case, page 1) of the modified digital document 602b.

In some embodiments, the section reflow system 106 can utilize the scaling factor 604 in a dynamic fashion. For example, the scaling factor 604 may include a minimum or maximum scaling factor (e.g., as a threshold scaling factor configured according to a printing device, a computing device such as the client device 108 or the server(s) 102, etc.). Additionally or alternatively, the scaling factor 604 may include an adjustable scaling factor that can dynamically adjust according to user input or as intelligently determined by the section reflow system 106. For example, an adjustable scaling factor may adjust between a minimum and/or maximum scaling factor, for example, as needed to modify how the section reflow system 106 positions document objects in the modified digital document 602b. As another example, the section reflow system 106 can apply different scaling factors to different document sections (e.g., apply a scaling factor so that the document section will just fit on the page).

In some embodiments, the section reflow system 106 can apply one or more scaling factors 604 to a document object to determine whether the document object will fit on a single page. For example, the section reflow system 106 may apply a threshold scaling factor to a document object. If the document object does not fit within a single page after applying a threshold scaling factor, the section reflow system 106 can move the document object to a next page or split the document object. Otherwise, as shown in FIG. 6B, the document object may fit within a single page after applying a threshold scaling factor to the document object. In some embodiments, the section reflow system 106 can adjust the scaling factor to fill the remainder of the page with the document object (e.g., increase the scaling factor so that the document section fills empty space on the page, but allows the document section to fit on the page).

Figure 7A:
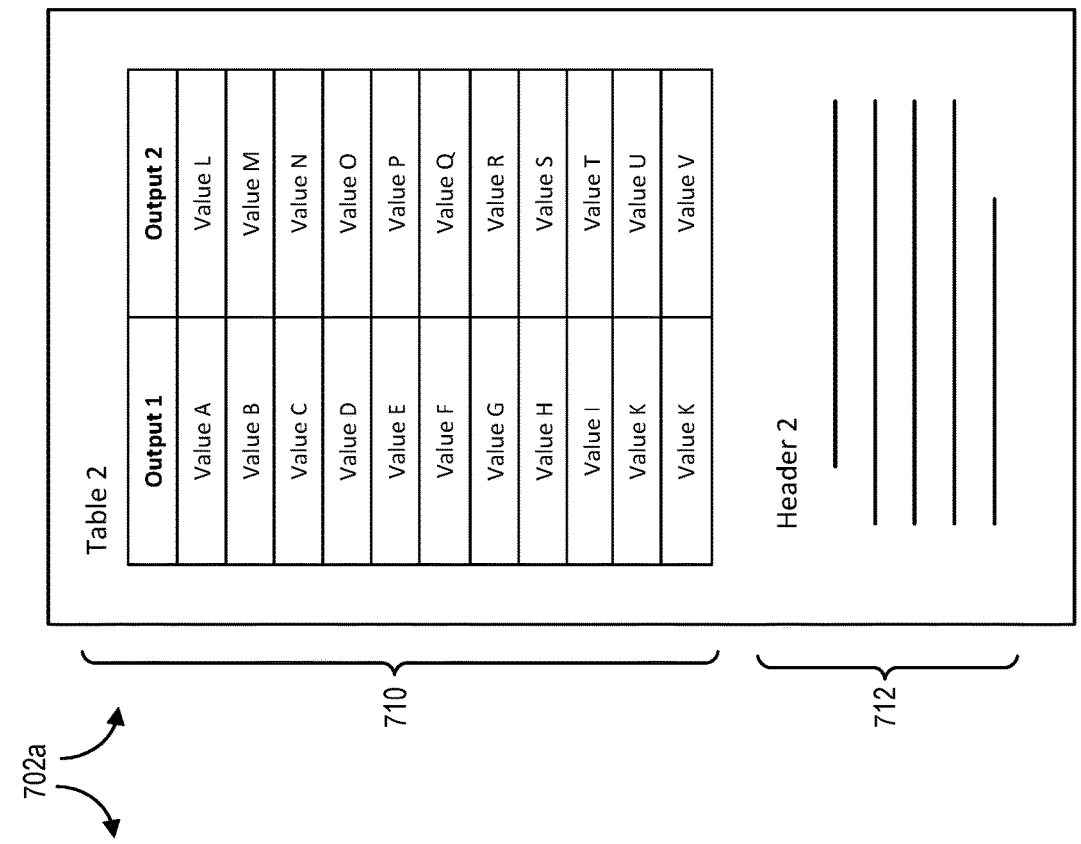
FIGS. 7A-7B illustrate a section reflow system generating a modified digital document in accordance with one or more embodiments.
Figure 7A:
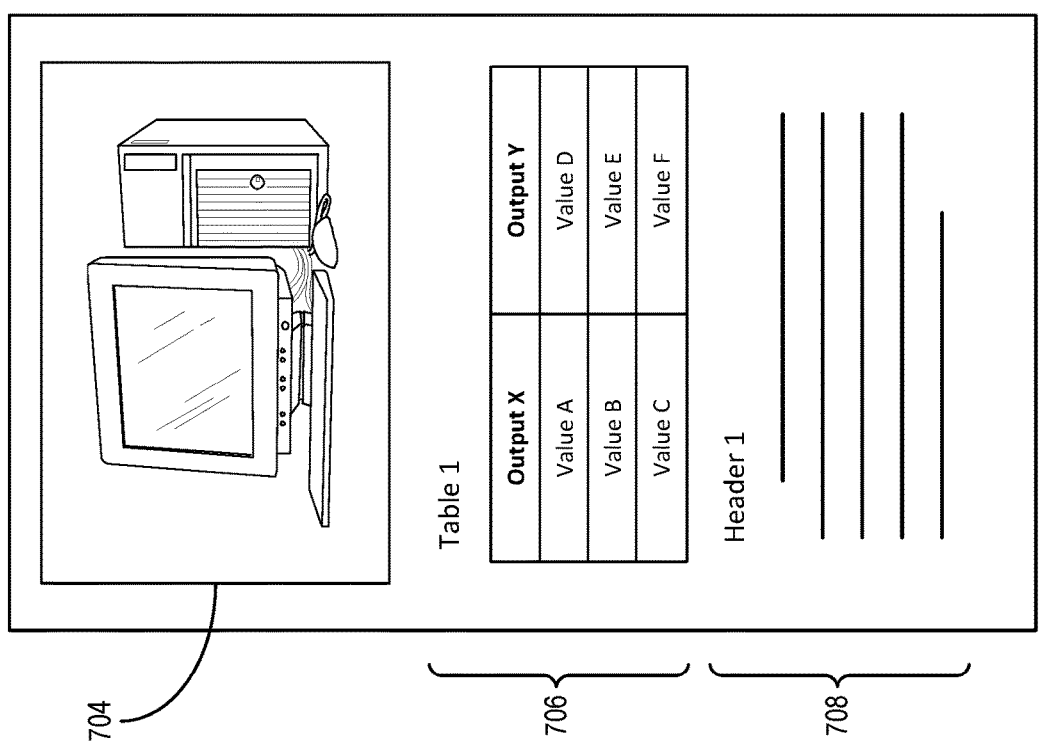
Figure 7B:
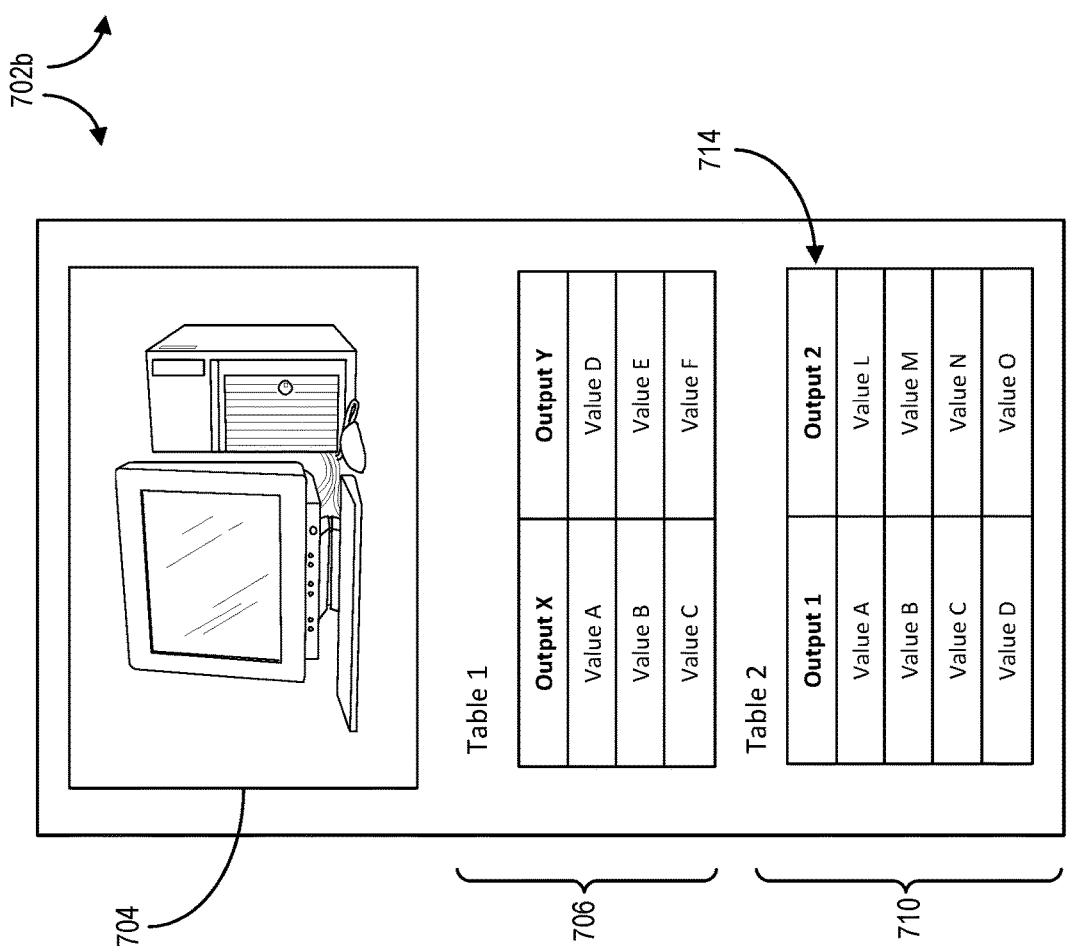

As mentioned above, the section reflow system 106 can generate a modified digital document comprising selected document sections based on the type of digital content within a document section. FIGS. 7A-7B illustrate the section reflow system 106 generating a modified digital document in accordance with one or more embodiments based on a document section comprising a table. In particular, FIG. 7A illustrates a digital document 702a (i.e., a digital document image) comprising document sections 704-712 (e.g., identified according to acts and algorithms discussed above in relation to FIG. 3A). For example, as described in relation to the foregoing figures, the section reflow system 106 can identify location data and object-content data of document objects. Based on the identified location data and object-content data, the section reflow system 106 can group document objects together into the document sections 704-712 as shown. Then, in response to a user selection to print one or more of the document sections 704-712, the section reflow system 106 can remove unselected document sections and reposition one or selected document sections (e.g., as described above in relation to FIG. 3B).

As an example, FIG. 7B illustrates the section reflow system 106 generating a modified digital document 702b with document sections 704, 706, and 710 in accordance with a user print selection. To generate the modified digital document 702b, the section reflow system 106 removes document sections 708 and 712 (which correspond to unselected document sections). For example, the section reflow system 106 can remove the document sections 708 and 712 by leveraging the location data for the identified document objects corresponding to the document sections 708 and 712. For instance, as described above, the section reflow system 106 can crop a portion of the digital document 702a between upper and lower boundaries of each of the document sections 708 and 712.

Based on removal of the document sections 708 and 712, the section reflow system 106 can determine whether the document section 710 fits in whitespace that results from removal of the document section 708. To determine whether the document section 710 fits within the whitespace, the section reflow system 106 can compare the respective sizes of the document sections 708 and 710. Because the section reflow system 106 determines from the comparison that the document section 710 is larger than the whitespace left by the removal of the document section 708, the section reflow system 106 can determine that the document section 710 does not fit within the whitespace.

As a result of the document section 710 not fitting within the whitespace, the section reflow system 106 can determine whether to keep the document section 710 on page 2 or split the document section 710 between page 1 and page 2. As discussed above, the section reflow system 106 can split some document sections that include text or tables. Other types of document sections that include images, for example, may not be divisible. Thus, based on object-content data identified according to heuristic and/or machine-learning model approaches discussed above, the section reflow system 106 can identify the document section 710 as a dividable table comprising a header row 714 that includes "Output 1" and "Output 2."

To determine a dividing point in the document section 710, the section reflow system 106 can determine a first portion of Table 2 that fits on page 1. To do so, the section reflow system 106 may select a portion of Table 2 that is sized less than or equal to a size of the document section 708 that was previously positioned on page 1. Based on the sizing/fit comparison, the section reflow system 106 may determine the dividing point for the document section 710 is between "Value D" and "Value E" in the "Output 1" column. For the remaining (i.e., second) portion of Table 2, the section reflow system 106 may reposition values E-K and values P-V to a top portion of page 2.

Where the section reflow system 106 splits the document section 710 between multiple pages, the section reflow system 106 may determine whether any portion of the document section 710 should be replicated in the subsequent pages for readability purposes. In particular, where the document section 710 is a table, the section reflow system 106 may therefore apply the identified header row 714 to each subsequent page that the table spans. In so doing, the section reflow system 106 can enhance a readability of the modified digital document 702b.

Figure 8A:
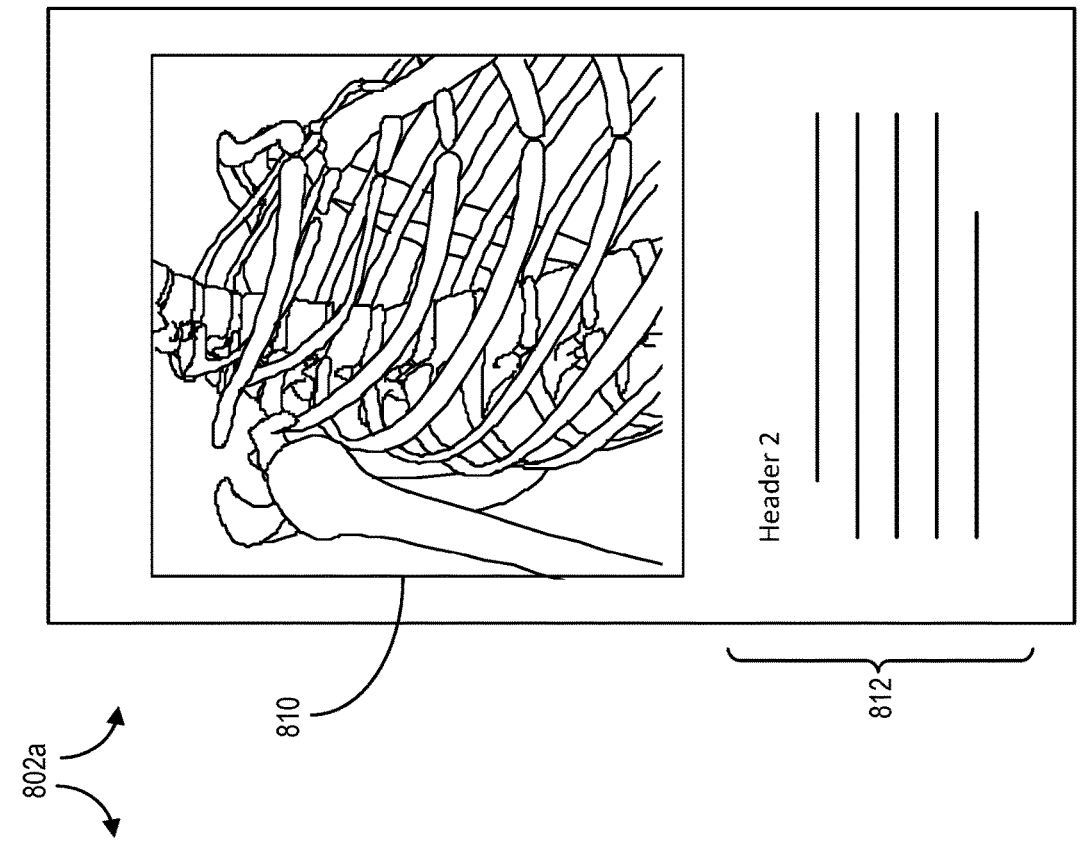
FIGS. 8A-8B illustrate a section reflow system generating a modified digital document in accordance with one or more embodiments.
Figure 8A:
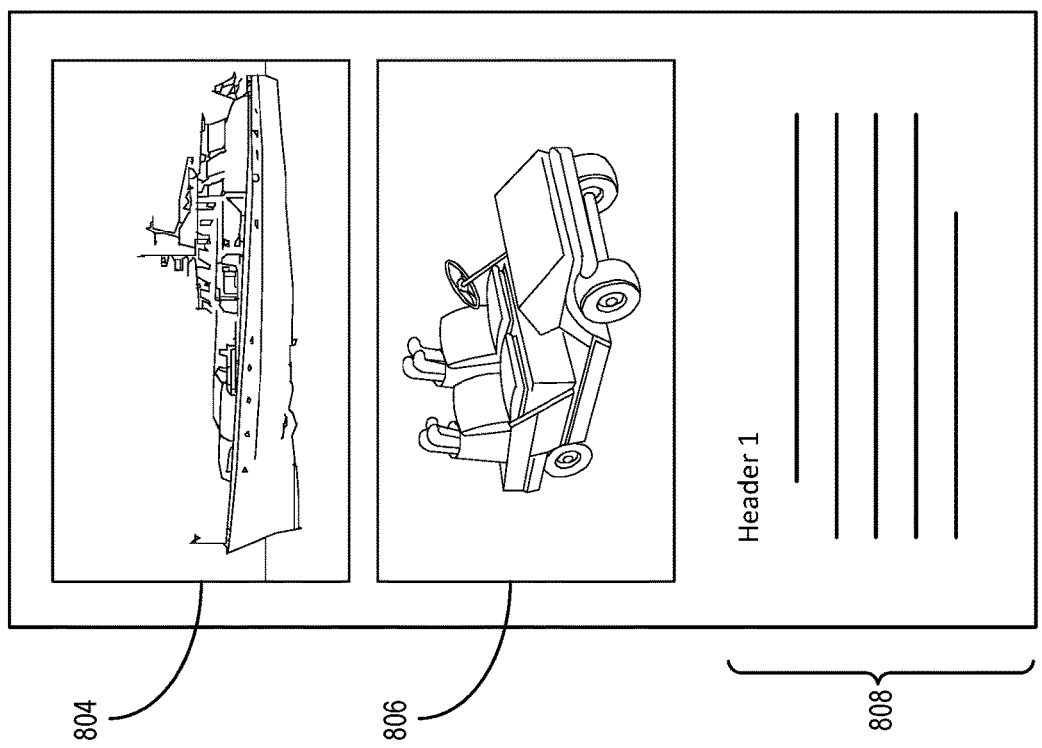
Figure 8B:
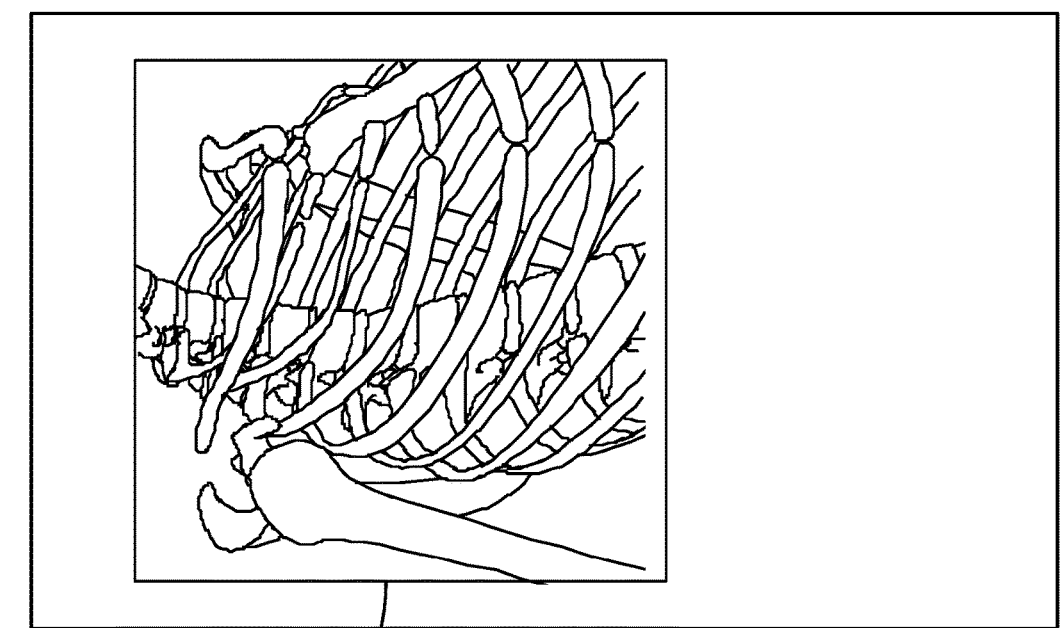
Figure 8B:
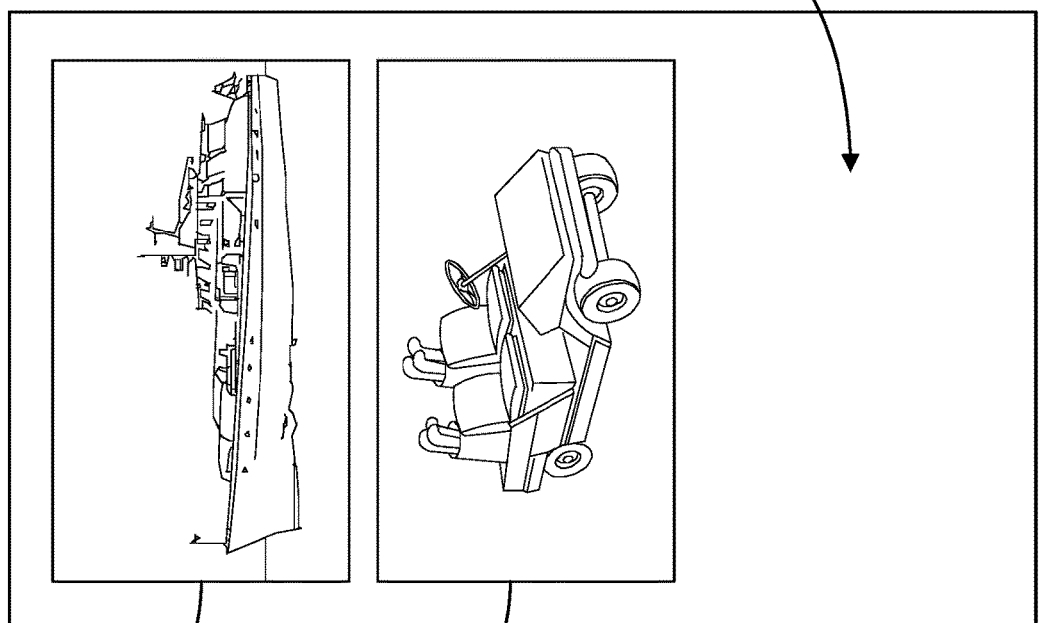

As mentioned above, the section reflow system 106 can generate a modified digital document that includes digital images. FIGS. 8A-8B illustrate the section reflow system 106 generating a modified digital document by moving digital images between pages in accordance with one or more embodiments. In particular, FIG. 8A illustrates a digital document 802a (i.e., a digital document image) comprising document sections 804-812 (e.g., identified according to acts and algorithms discussed above in relation to FIG. 3A). For example, as similarly described above, the section reflow system 106 can identify location data and object-content data of document objects. Based on the identified location data and object-content data, the section reflow system 106 can group document objects together into the document sections 804-812 as shown. Then, in response to a user selection to print one or more document sections, the section reflow system 106 can remove unselected document sections and reposition one or selected document sections (e.g., utilizing acts and algorithms discussed above in relation to FIG. 3B).

As an example, FIG. 8B illustrates the section reflow system 106 generating a modified digital document 802b with document sections 804, 806, and 810 in accordance with a user print selection. To generate the modified digital document 802b, the section reflow system 106 removes document sections 808 and 812 (which correspond to unselected document sections). For example, the section reflow system 106 can remove the document sections 808 and 812 by leveraging the location data for the identified document objects corresponding to the document sections 808 and 812. For instance, as described above, the section reflow system 106 can crop a portion of the digital document 802a between upper and lower boundaries of each of the document sections 808 and 812.

Based on removal of the document sections 808 and 812, the section reflow system 106 can determine whether the document section 810 fits in a whitespace 814 that results from removal of the document section 808. For example, as similarly mentioned above in relation to FIGS. 7A-7B, the section reflow system 106 can compare the respective sizes of the document sections 808 and 810 to determine that the document section 810 does not fit within the whitespace 814.

Moreover, based on object-content data identified according to heuristic and/or machine-learning model approaches discussed above, the section reflow system 106 can identify the document section 810 as an indivisible digital image. For example, the section reflow system 106 may identify that the document section 810 is a digital image based on metadata that includes a dots per inch value. Additionally or alternatively, the section reflow system 106 may identify that the document section 810 is a digital image based on identifying raster image or bitmap properties associated with the document section 810.

In accordance with identifying the document section 810 as an indivisible digital image, the section reflow system 106 maintains the document section 810 at its original position at the top of page 2 without filling in the whitespace 814 on page 1. Thus, rather than splitting the document section 810 as explained above for document section 710 in relation to FIGS. 7A-7B, the section reflow system 106 performs a position adjustment determination as described above in relation to FIG. 3B by keeping the document section 810 on page 2. Were there a portion of the whitespace 814 on the top of page 2 above the document section 810 (not illustrated), the section reflow system 106 could, in some implementations, move the document section 810 to the top of page 2, but not onto page 1.

Additionally or alternatively, in some embodiments, the section reflow system 106 may apply a scaling factor (e.g., as described above in relation to FIGS. 6A-6B) to one or more of the document sections 804, 806, or 810 in response to initially failing to fit the document section 810 onto page 1. If the document section 810 does not fit on page 1 after applying a scaling factor or other suitable modification, the section reflow system 106 may move the document section 810 to the top of page 2 as stated above. Otherwise, if the document section 810 does fit on page 1 after applying a modification to one or more of the document sections 804, 806, or 810, the section reflow system 106 can move the document section 810 to fill the whitespace 814 on page 1 and delete page 2 rendered unnecessary.

Figure 9:
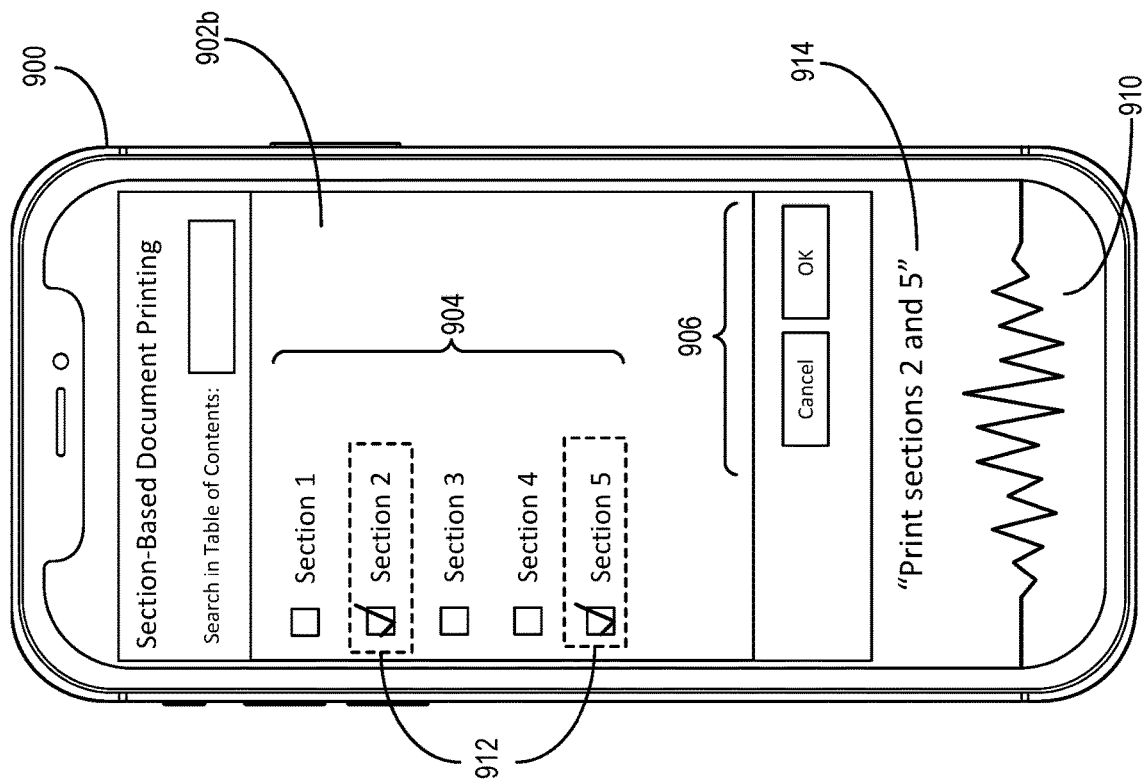
FIG. 9 illustrates a section reflow system providing user interfaces on a computing device in accordance with one or more embodiments.
Figure 9:
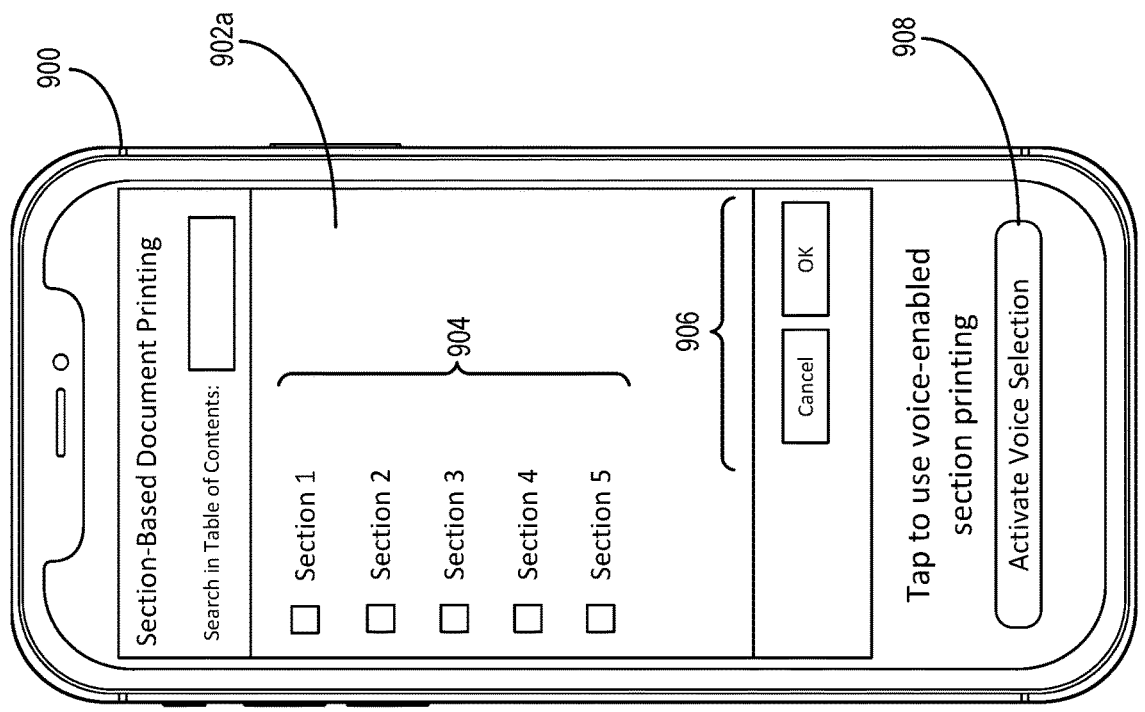

As mentioned above, the section reflow system 106 can utilize a variety of different configurations and/or implementations of a printing user interface. For example, in some embodiments, the section reflow system can provide audio content to a speech-to-text model in response to activation of voice-enabled print selection at the printing user interface. FIG. 9 illustrates the section reflow system 106 providing user interfaces 902a-902b on a computing device 900 in accordance with one or more embodiments. In particular, the user interface 902a comprises document sections 904 as described in relation to the foregoing figures, options 906 to confirm or cancel a user selection, and a voice-activation element 908. In response to a user input at the voice-activation element 908, the section reflow system 106 can activate an audio relay mechanism. An example of an audio relay mechanism includes an audio recorder at the computing device 900 configured to capture and transmit (e.g., to a speech-to-text model) a verbal utterance comprising an indication of one or more document sections to print. Additionally or alternatively, in response to a user input at the voice-activation element 908, the section reflow system 106 can activate one or more speech-to-text algorithms on the computing device 900 that are configured to receive input in the form of a verbal utterance comprising an indication of one or more document sections to print.

As an example, the user interface 902b in FIG. 9 illustrates a verbal utterance 910. In response to receiving the verbal utterance 910 at the computing device 900, the section reflow system 106 identifies one or more corresponding document sections. Moreover, the section reflow system 106 modifies the user interface 902b to include user input representations 912 (e.g., checked boxes) and a first text string 914 (e.g., "Print sections 2 and 5").

In these or other embodiments, the section reflow system 106 can utilize a speech-to-text model to generate the first text string 914 representing the verbal utterance 910. In addition, the section reflow system 106 can utilize the speech-to-text model to compare the first text string 914 to a plurality of text strings representing document sections in the table of contents (e.g., document sections 904). By comparing the first text string 914 representing the verbal utterance 910 and the plurality of text strings corresponding to the document sections 904, the section reflow system 106 can determine which of the document sections 904 match (or most suitably relate to) the first text string 914. For example, in some embodiments, the section reflow system 106 may compare a semantic similarity between the first text string 914 and each respective text string of the plurality of text strings for the document section 904. If a semantic similarity satisfies a threshold semantic similarity, then the section reflow system 106 may select the corresponding document section 904 for printing in a modified digital document as disclosed herein.

Alternatively to the foregoing, in some embodiments, the section reflow system 106 can receive voice inputs without a user interface. For example, the section reflow system 106 can detect a user providing a verbal utterance of "print section 2.1." In some implementations, the section reflow system 106 can respond to voice-activation prior to receiving the verbal utterance. For instance, the section reflow system 106 can respond to voice-activation via keywords or phrases (e.g., "Hey Adobe") that indicate a voice input will follow the voice-activation.

In response to detecting the verbal utterance, the section reflow system 106 can utilize a speech-to-text model to generate a text string representing the verbal utterance. In addition, and similar to the above description, the section reflow system 106 can then compare the text string representing the verbal utterance with a plurality of text strings representing identified document sections. Based on semantic similarities identified in the comparison that satisfy a threshold semantic similarity, the section reflow system 106 can select one or more document sections for printing in a modified digital document.

Figure 10:
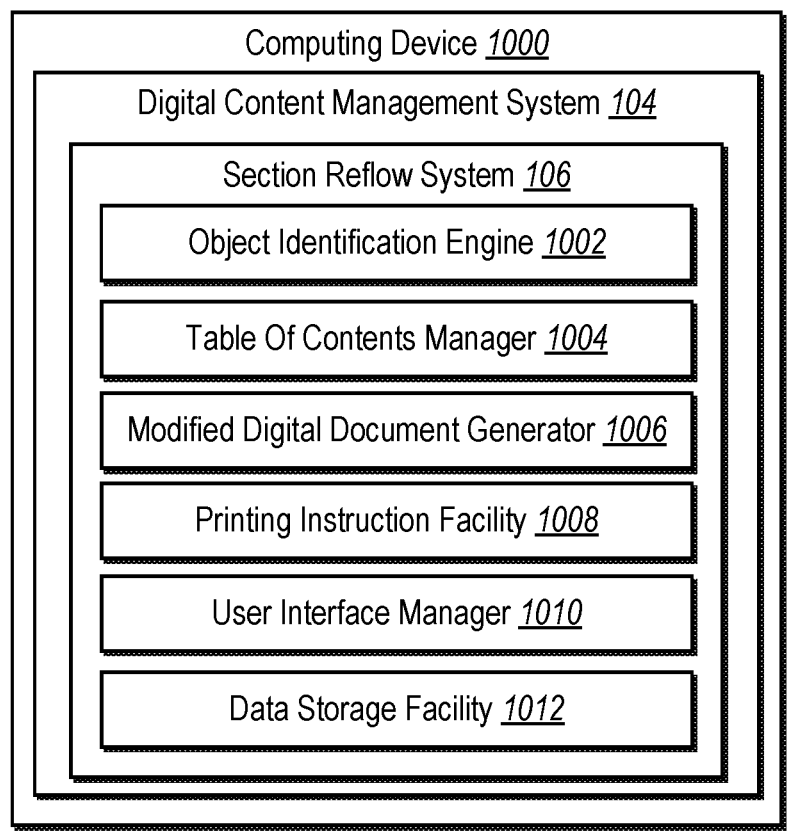
FIG. 10 illustrates an example schematic diagram of a section reflow system in accordance with one or more embodiments.

Turning to FIG. 10, additional detail will now be provided regarding various components and capabilities of the section reflow system 106. In particular, FIG. 10 illustrates an example schematic diagram of a computing device 1000 (e.g., the server(s) 102, the client device 108, and/or the printing device 112) implementing the section reflow system 106 in accordance with one or more embodiments of the present disclosure. As shown, the section reflow system 106 is further implemented by the digital content management system 104. Also illustrated, the section reflow system 106 can include an object identification engine 1002, a table of contents manager 1004, a modified digital document generator 1006, a printing instruction facility 1008, a user interface manager 1010, and a data storage facility 1012.

The object identification engine 1002 can identify, locate, isolate, determine, and/or label document objects within a digital document (as described in relation to the foregoing figures). For example, the object identification engine 1002 can utilize a machine-learning model to intelligently determine location data and/or object-content data of a given document object. Specifically for location data, the object identification engine 1002 can obtain, generate, and/or determine upper boundaries, lower boundaries, and page ranges of document objects. Likewise for object-content data, the object identification engine 1002 can analyze, compare, extract, etc. to identify textual data, image data, and table data of document objects. Then, utilizing the textual data, image data, and/or table data of document objects, the object identification engine 1002 can generate document-object identifiers.

The table of contents manager 1004 can generate a table of contents and/or provide a table of contents in a printing user interface (as described in relation to the foregoing figures). For example, the table of contents manager 1004 can arrange the table of contents to include document sections in the form of selectable printing elements. To do so, the table of contents manager 1004 can arrange document-object identifiers representing one or more document objects in a location-based manner (e.g., according to the location data provided by the object identification engine 1002).

The modified digital document generator 1006 can generate a modified digital document (as described in relation to the foregoing figures). For example, the modified digital document generator 1006 can remove unselected document sections and reposition selected document sections. To do so, the modified digital document generator 1006 may crop portions of the document that correspond to the identified metes and bounds of unselected document sections (e.g., utilizing the location data of document objects provided by the object identification engine 1002). In addition, the modified digital document generator 1006 can move one or more of the selected document sections to fill whitespace resulting from the removal of the unselected document sections. Further, the modified digital document generator 1006 can move one or more of the selected document sections subject to a print boundary determination and/or position adjustment determination. If a document section as positioned fails to satisfy a print boundary determination, the modified digital document generator 1006 can determine how to adjust the position based on the document object(s) of the document section. For example, if document section comprises text or tables, the modified digital document generator 1006 can determine a dividing point for spanning the text or table over multiple pages. If the document section comprises a digital image, the modified digital document generator 1006 can move the image to the next page.

With the modified digital document generated at the modified digital document generator 1006, the printing instruction facility 1008 can transmit the modified digital document for printing in accordance with a user selection of document sections. Beforehand, the printing instruction facility 1008 can send the modified digital document to a printing engine that analyzes and processes the modified digital document. For example, the printing instruction facility 1008 can send the modified digital document to a printing engine that flattens, rips, renders, or otherwise processes the modified digital document in preparation for printing at a printing device.

After analysis and processing at a printing engine, in some embodiments, the printing instruction facility 1008 transmits the modified digital document to a printing device. In other embodiments where the computing device 1000 comprises the server(s) 102, the printing instruction facility 1008 transmits the modified digital document to a client device (e.g., the client device 108) for subsequent transmission to a printing device.

The user interface manager 1010 can provide, manage, and/or control a graphical user interface (or simply "user interface"). In particular, the user interface manager 1010 may generate and display a user interface (e.g., a printing user interface) by way of a display screen composed of a plurality of graphical components, objects, and/or elements that allow a user to perform a function. For example, the user interface manager 1010 can receive user inputs from a user, such as a click/tap to provide a user selection of one or more document sections at a printing user interface. Additionally or alternatively, the user interface manager 1010 can activate voice-enabled section printing in response to a user input at a printing user interface to provide verbal utterances of the desired document sections to print. In these or other embodiments, the user interface manager 1010 can present a variety of types of information, including text, digital media items, search results, product recommendations, or other information.

The data storage facility 1012 maintains data for the section reflow system 106. The data storage facility 1012 (e.g., via one or more memory devices) can maintain data of any type, size, or kind, as necessary to perform the functions of the section reflow system 106, including digital documents selected for printing, document sections, document objects, digital document images, locations of document objects within digital documents, or various parameters, such as printing boundaries, scaling factors, and the like.

Each of the components of the computing device 1000 can include software, hardware, or both. For example, the components of the computing device 1000 can include one or more instructions stored on a computer-readable storage medium and executable by processors of one or more computing devices, such as a client device or server device. When executed by the one or more processors, the computer-executable instructions of the section reflow system 106 can cause the computing device(s) (e.g., the computing device 1000) to perform the methods described herein. Alternatively, the components of the computing device 1000 can include hardware, such as a special-purpose processing device to perform a certain function or group of functions. Alternatively, the components of the computing device 1000 can include a combination of computer-executable instructions and hardware.

Furthermore, the components of the computing device 1000 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 1000 may be implemented as a stand-alone application, such as a desktop or mobile application. Furthermore, the components of the computing device 1000 may be implemented as one or more web-based applications hosted on a remote server.

The components of the computing device 1000 may also be implemented in a suite of mobile device applications or "apps." To illustrate, the components of the computing device 1000 may be implemented in an application, including but not limited to ADOBE® ACROBAT, ADOBE® INDESIGN, ADOBE® PHOTOSHOP, ADOBE® LIGHTROOM, ADOBE® ILLUSTRATOR, ADOBE® SIGN, or ADOBE® READER. Product names, including "ADOBE" and any other portion of one or more of the foregoing product names, may include registered trademarks or trademarks of Adobe Inc. in the United States and/or other countries.

Figure 11:
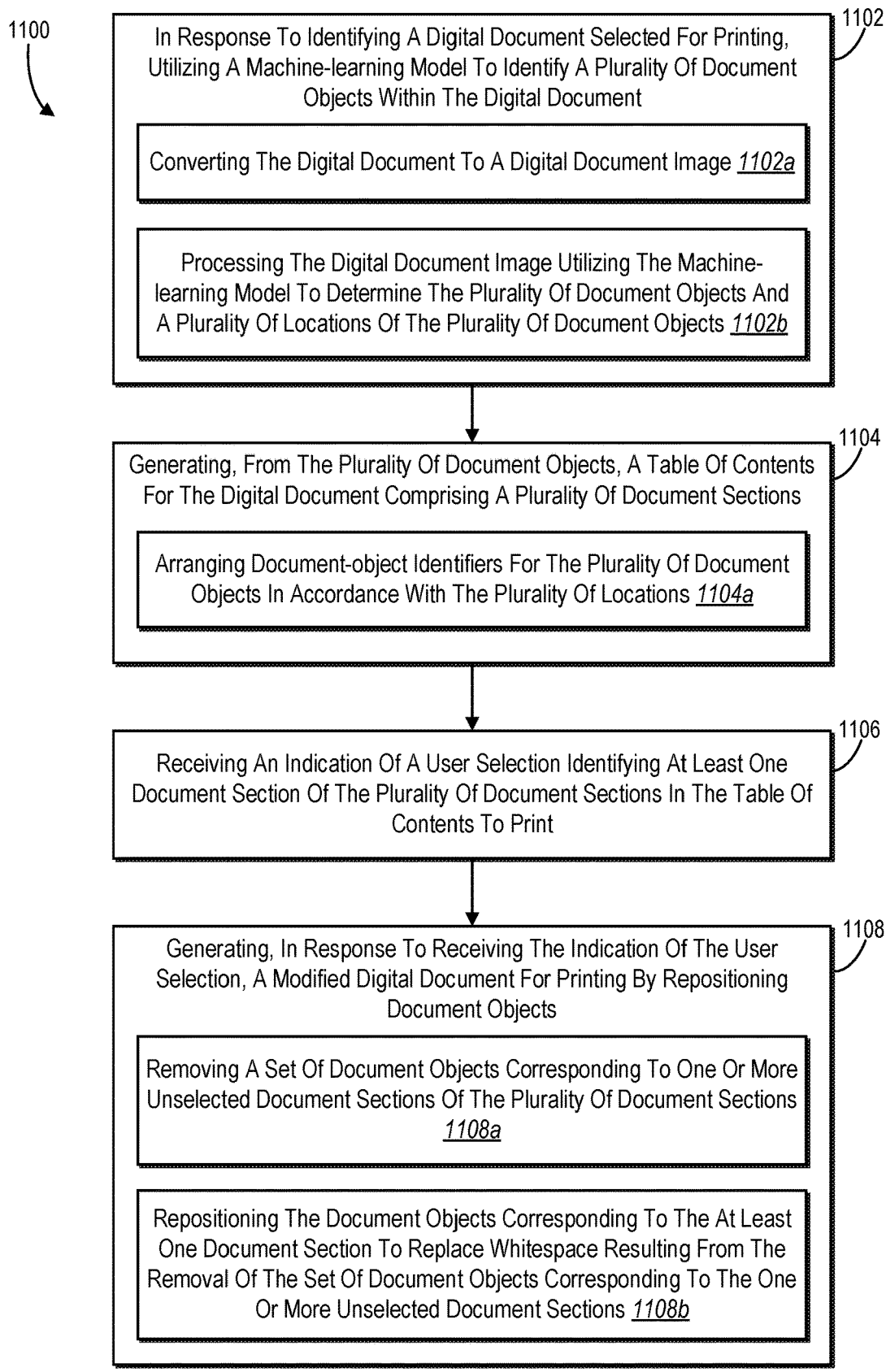
FIG. 11 illustrates a flowchart of a series of acts for generating a modified digital document for printing in accordance with one or more embodiments.

FIGS. 1-10, the corresponding text, and the examples provide several different systems, methods, techniques, components, and/or devices of the section reflow system 106 in accordance with one or more embodiments. In addition to the above description, one or more embodiments can also be described in terms of flowcharts including acts for accomplishing a particular result. For example, FIG. 11 illustrates a flowchart of a series of acts 1100 for generating a modified digital document for printing in accordance with one or more embodiments. The section reflow system 106 may perform one or more acts of the series of acts 1100 in addition to or alternatively to one or more acts described in conjunction with other figures. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown, the series of acts 1100 includes an act 1102 of in response to identifying a digital document selected for printing, utilizing a machine-learning model to identify a plurality of document objects within the digital document. As part of act 1102, the series of acts 1100 further includes act 1102*a* of utilizing the machine-learning model to identify the plurality of document objects by converting the digital document to a digital document image.

In addition to act 1102, the series of acts 1100 further includes an act 1102*b* of utilizing the machine-learning model to identify the plurality of document objects by processing the digital document image utilizing the machine-learning model to determine the plurality of document objects and a plurality of locations of the plurality of document objects. In these or other embodiments, determining the plurality of locations of the plurality of document objects comprises: determining a first coordinate location referencing an upper boundary of a document object; determining a second coordinate location referencing a lower boundary of the document object; and determining a page range of the document object within the digital document.

The series of acts 1100 further includes an act 1104 of generating, from the plurality of document objects, a table of contents for the digital document comprising a plurality of document sections. In addition to act 1104, the series of acts 1100 further includes an act 1104*a* of generating the table of contents for the digital document by arranging document-object identifiers for the plurality of document objects in accordance with the plurality of locations. The series of acts 1100 further includes an act 1106 of receiving an indication of a user selection identifying at least one document section of the plurality of document sections in the table of contents to print.

The series of acts 1100 further includes an act 1108 of generating, in response to receiving the indication of the user selection, a modified digital document for printing by repositioning document objects corresponding to the at least one document section from the table of contents within the modified digital document. In addition to act 1108, the series of acts 1100 further includes an act 1108*a* of processing the plurality of document objects to generate the modified digital document by removing a set of document objects corresponding to one or more unselected document sections of the plurality of document sections. Further to act 1108, the series of acts 1100 includes an act 1008*b* of processing the plurality of document objects to generate the modified digital document by repositioning the document objects corresponding to the at least one document section to replace whitespace resulting from the removal of the set of document objects corresponding to the one or more unselected document sections.

Additionally or alternatively at act 1108, the at least one document section corresponding to the user selection comprises a first document section and a second document section that are not adjacent in the digital document. In these or other embodiments, act 1108 may include processing the plurality of document objects to generate the modified digital document by: repositioning a first set of document objects corresponding to the first document section to a top portion of a document page in the modified digital document; and repositioning a second set of document objects corresponding to the second document section in sequential order immediately after the first document section in the modified digital document.

Additionally or alternatively, act 1108 may include processing the plurality of document objects to generate the modified digital document by: determining that a document object corresponding to a first document section exceeds a print boundary for a first modified page in the modified digital document; dividing the first document section into a first portion that fits on the first modified page and a second portion that fits on a second modified page; and repositioning the first portion to the first modified page and the second portion to the second modified page.

Additionally or alternatively, act 1108 may include processing the plurality of document objects to generate the modified digital document by: determining that a document object exceeds a print boundary for a first modified page in the modified digital document; determining that the document object corresponds to a digital image; and in response to determining that the document object corresponds to a digital image, repositioning the document object onto a second modified page in the modified digital document immediately following the first modified page.

It is understood that the outlined acts in the series of acts 1100 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 11, act(s) in the series of acts 1100 may include an act of causing the computing device to provide, for display within a printing user interface, the table of contents by providing a plurality of selectable printing elements corresponding to the plurality of document sections within the printing user interface. In yet another example of an additional act not shown in FIG. 11, act(s) in the series of acts 1100 may include an act of causing the computing device to transmit the modified digital document to a printing device for printing the modified digital document.

As another example of an additional act not shown in FIG. 11, act(s) in the series of acts 1100 may include an act of causing the computing device to receive the indication of the user selection by: identifying a verbal utterance comprising the at least one document section; utilizing a speech-to-text model to generate a first text string representing the verbal utterance comprising the at least one document section; and comparing the first text string to a plurality of text strings representing the plurality of document sections in the table of contents to determine the first text string corresponds to the at least one document section in the table of contents.

In addition (or in the alternative) to the acts described above, in some embodiments, the series of acts 1100 can include performing a step for generating a modified digital document to print comprising at least one user-selected document section from the plurality of document sections in the table of contents. For instance, the acts and algorithms described above in relation to FIG. 2, FIGS. 3A-3B can comprise the corresponding acts (or structure) for a step for generating a modified digital document to print comprising at least one user-selected document section from the plurality of document sections in the table of contents.

Further, as additional and/or alternative embodiments (e.g., with variations) to the acts described above, the series of acts 1100 can include: generating a table of contents for the digital document by partitioning the digital document into a plurality of document sections based on the plurality of document objects; providing, for display within a printing user interface, the table of contents by providing a plurality of selectable printing elements corresponding to the plurality of document sections within the printing user interface; and in response to receiving an indication of a user selection of at least one document section to print from the plurality of document sections in the table of contents of the printing user interface, generating a modified digital document for printing by: identifying one or more document objects from the plurality of document objects corresponding to the at least one document section; determining one or more positions of the one or more document objects from the plurality of positions; and repositioning the one or more document objects from the one or more positions to at least one modified position to generate the modified digital document.

Further to the additional and/or alternative embodiments (e.g., with variations) to the acts described above, the series of acts 1100 can include: converting the digital document to a digital document image; and processing the digital document image utilizing a machine-learning model to: determine a first coordinate location referencing an upper boundary of a document object; determine a second coordinate location referencing a lower boundary of the document object; and determine a page range of the document object within the digital document.

In these or other embodiments, the one or more computing devices are configured to reposition the one or more document objects from the one or more positions to the at least one modified position by moving a document object based on the first coordinate location, the second coordinate location, and the page range to a modified location within the modified digital document. Additionally or alternatively, in some embodiments the one or more computing devices are configured to reposition the one or more document objects from the one or more positions to the at least one modified position by: in response to receiving the indication of the user selection, identifying one or more unselected document sections of the plurality of document sections; and removing a set of document objects corresponding to one or more unselected document sections of the plurality of document sections. Further, in some embodiments, the one or more computing devices are configured to reposition the one or more document objects corresponding to the user selection of the at least one document section to replace whitespace resulting from the removal of the set of document objects corresponding to the one or more unselected document sections.

Further to the additional and/or alternative embodiments (e.g., with variations) to the acts described above, the series of acts 1100 can include repositioning the one or more document objects from the one or more positions to the at least one modified position by: determining that a document object exceeds a print boundary for a first modified page in the modified digital document; determining that the document object corresponds to a table; in response to determining that the document object corresponds to a table, dividing the table into a first portion that fits on the first modified page and a second portion that fits on a second modified page; and repositioning the first portion to the first modified page and the second portion to the second modified page.

As more additional and/or alternative embodiments (e.g., with variations) to the acts described above, the series of acts 1100 can include: identifying a plurality of document objects within a digital document selected for printing; generating, from the plurality of document objects, a table of contents for the digital document comprising a plurality of document sections; and performing a step for generating a modified digital document to print comprising at least one user-selected document section from the plurality of document sections in the table of contents. In these or other embodiments, identifying the plurality of document objects comprises: converting the digital document to a digital document image; and processing the digital document image utilizing a machine-learning model to determine the plurality of document objects.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
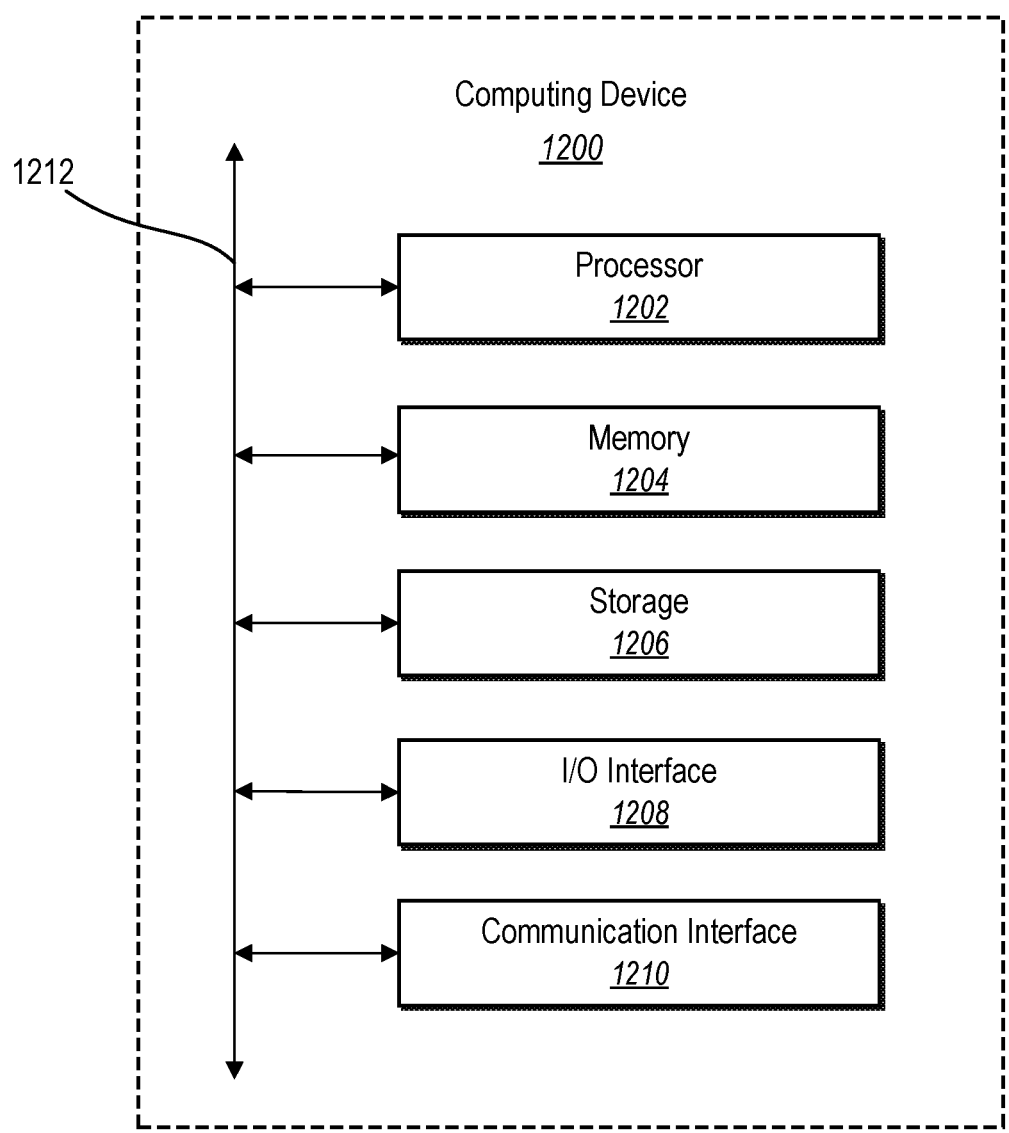
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., the computing device 1000, the computing device 900, the server(s) 102, the printing device 112, and/or the client device 108). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting.

Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of the computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
   in response to identifying a digital document selected for printing, utilize a machine-learning model to identify a plurality of document objects within the digital document;
   generate, from the plurality of document objects, a table of contents for the digital document comprising a plurality of document sections;
   receive an indication of a user selection identifying at least one document section of the plurality of document sections in the table of contents to print; and
   generate, in response to receiving the indication of the user selection, a modified digital document for printing by removing a first set of document objects corresponding to one or more unselected document sections of the plurality of document sections and repositioning a second set of document objects corresponding to the at least one document section from the table of contents to replace whitespace from removal of the one or more unselected document sections.

2. The non-transitory computer-readable medium of claim 1, further comprising instructions that, when executed by the at least one processor, cause the computing device to utilize the machine-learning model to identify the plurality of document objects by:
   converting the digital document to a digital document image; and
   processing the digital document image utilizing the machine-learning model to determine the plurality of document objects and a plurality of locations of the plurality of document objects.

3. The non-transitory computer-readable medium of claim 2, further comprising instructions that, when executed by the at least one processor, cause the computing device to determine the plurality of locations of the plurality of document objects by:
   determining a first coordinate location referencing an upper boundary of a document object;
   determining a second coordinate location referencing a lower boundary of the document object; and
   determining a page range of the document object within the digital document.

4. The non-transitory computer-readable medium of claim 3, further comprising instructions that, when executed by the at least one processor, cause the computing device to generate the table of contents for the digital document by arranging document-object identifiers for the plurality of document objects in accordance with the plurality of locations.

5. The non-transitory computer-readable medium of claim 1, wherein the at least one document section corresponding to the user selection comprises a first document section and a second document section that are not adjacent in the digital document, and wherein the non-transitory computer-readable medium further comprises instructions that, when executed by the at least one processor, cause the computing device to process the plurality of document objects to generate the modified digital document by:
repositioning a first group of document objects corresponding to the first document section to a top portion of a document page in the modified digital document; and
repositioning a second group of document objects corresponding to the second document section in sequential order immediately after the first document section in the modified digital document.

6. The non-transitory computer-readable medium of claim 1, further comprising instructions that, when executed by the at least one processor, cause the computing device to process the plurality of document objects to generate the modified digital document by:
comparing a size of the whitespace remaining on a first page with a size of the second set of document objects corresponding to the at least one document section; and
upon determining the size of the second set of document objects corresponding to the at least one document section is larger than the size of the whitespace remaining on the first page, performing at least one of:
splitting the at least one document section across the first page and a second page following the first page; or
beginning the at least one document section on the second page.

7. The non-transitory computer-readable medium of claim 1, further comprising instructions that, when executed by the at least one processor, cause the computing device to process the plurality of document objects to generate the modified digital document by:
determining that a document object corresponding to a first document section exceeds a print boundary for a first modified page in the modified digital document;
dividing the first document section into a first portion that fits on the first modified page and a second portion that fits on a second modified page; and
repositioning the first portion to the first modified page and the second portion to the second modified page.

8. The non-transitory computer-readable medium of claim 1, further comprising instructions that, when executed by the at least one processor, cause the computing device to process the plurality of document objects to generate the modified digital document by:
determining that a document object exceeds a print boundary for a first modified page in the modified digital document;
determining that the document object corresponds to a digital image; and
in response to determining that the document object corresponds to a digital image, repositioning the document object onto a second modified page in the modified digital document immediately following the first modified page.

9. The non-transitory computer-readable medium of claim 1, further comprising instructions that, when executed by the at least one processor, cause the computing device to provide, for display within a printing user interface, the table of contents by providing a plurality of selectable printing elements corresponding to the plurality of document sections within the printing user interface.

10. The non-transitory computer-readable medium of claim 1, further comprising instructions that, when executed by the at least one processor, cause the computing device to receive the indication of the user selection by:
identifying a verbal utterance comprising the at least one document section;
utilizing a speech-to-text model to generate a first text string representing the verbal utterance comprising the at least one document section; and
comparing the first text string to a plurality of text strings representing the plurality of document sections in the table of contents to determine the first text string corresponds to the at least one document section in the table of contents.

11. The non-transitory computer-readable medium of claim 1, further comprising instructions that, when executed by the at least one processor, cause the computing device to transmit the modified digital document to a printing device for printing the modified digital document.

12. A system comprising:
one or more memory devices comprising a digital document selected for printing, a plurality of document objects of the digital document, and a plurality of positions of the plurality of document objects within the digital document; and
one or more computing devices configured to cause the system to:
generate a table of contents for the digital document by partitioning the digital document into a plurality of document sections based on the plurality of document objects;
provide, for display within a printing user interface, the table of contents by providing a plurality of selectable printing elements corresponding to the plurality of document sections within the printing user interface; and
in response to receiving an indication of a user selection of at least one document section to print from the plurality of document sections in the table of contents of the printing user interface, generate a modified digital document for printing by:
removing a first set of document objects corresponding to one or more unselected document sections of the plurality of document sections;
identifying a whitespace based on removal of the first set of document objects;
determining one or more positions of a second set of document objects corresponding to the at least one document section; and
repositioning the second set of document objects from the one or more positions to fill the whitespace to generate the modified digital document.

13. The system of claim 12, wherein the one or more computing devices are configured to determine the one or more positions of the second set of document objects by:

converting the digital document to a digital document image; and processing the digital document image utilizing a machine-learning model to:

determine a first coordinate location referencing an upper boundary of a document object;

determine a second coordinate location referencing a lower boundary of the document object; and determine a page range of the document object within the digital document.

14. The system of claim 13, wherein the one or more computing devices are configured to reposition the second set of document objects from the one or more positions to fill the whitespace by moving a document object based on the first coordinate location, the second coordinate location, and the page range to a modified location within the modified digital document.

15. The system of claim 12, wherein the one or more computing devices are configured to reposition the second set of document objects from the one or more positions to fill the whitespace based on a size of the whitespace remaining on a page and a size of the second set of document objects.

16. The system of claim 12, wherein the one or more computing devices are configured to reposition the second set of document objects by aligning a top portion of the second set of document objects with a top portion of the whitespace.

17. The system of claim 12, wherein the one or more computing devices are configured to reposition the second set of document objects from the one or more positions to fill the whitespace based on:

determining that a document object exceeds a print boundary for a first modified page in the modified digital document;

determining that the document object corresponds to a table;

in response to determining that the document object corresponds to a table, dividing the table into a first portion that fits on the first modified page and a second portion that fits on a second modified page; and repositioning the first portion to the first modified page and the second portion to the second modified page.

18. A computer-implemented method comprising:

identifying a plurality of document objects within a digital document selected for printing;

generating, from the plurality of document objects, a table of contents for the digital document comprising a plurality of document sections; and performing a step for generating a modified digital document to print comprising at least one user-selected document section from the plurality of document sections in the table of contents.

19. The computer-implemented method of claim 18, wherein identifying the plurality of document objects comprises:

converting the digital document to a digital document image; and processing the digital document image utilizing a machine-learning model to determine the plurality of document objects.

20. The computer-implemented method of claim 18, further comprising providing, for display within a printing user interface, the table of contents by providing a plurality of selectable printing elements corresponding to the plurality of document sections within the printing user interface.

\* \* \* \* \*